(12) United States Patent
Kim et al.

(10) Patent No.: US 8,395,737 B2
(45) Date of Patent: *Mar. 12, 2013

(54) ARRAY SUBSTRATE AND DISPLAY DEVICE HAVING THE SAME

(75) Inventors: Su-Jeong Kim, Seoul (KR); Jang-Kun Song, Seoul (KR); Sung-Hwan Hong, Suwon-si (KR); Kee-Bum Park, Cheonan-si (KR); Seon-Ah Cho, Busan (KR); Hye-Ran You, Incheon (KR); Su-Han Woo, Asan-si (KR); Jae-Jin Lyu, Yongin-si (KR); Eun Cho, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,795

(22) Filed: Oct. 11, 2011

(65) Prior Publication Data

US 2012/0033170 A1 Feb. 9, 2012

Related U.S. Application Data

(63) Continuation of application No. 12/494,841, filed on Jun. 30, 2009.

(30) Foreign Application Priority Data

Dec. 23, 2008 (KR) .............................. 2008-131915

(51) Int. Cl.
*G02F 1/1337* (2006.01)
*G02F 1/1343* (2006.01)
(52) U.S. Cl. .................. 349/129; 349/130; 349/141
(58) Field of Classification Search ................ 349/141, 349/129–130

See application file for complete search history.

(56) References Cited

U.S. PATENT DOCUMENTS

| 7,605,897 B2 * | 10/2009 | Lu et al. ........................ 349/129 |
| 7,710,523 B2 * | 5/2010 | Nakanishi et al. ............ 349/129 |
| 7,768,616 B2 | 8/2010 | Huang et al. |
| 8,059,243 B2 * | 11/2011 | Kim et al. ..................... 349/129 |

* cited by examiner

*Primary Examiner* — James Dudek
(74) *Attorney, Agent, or Firm* — Cantor Colburn LLP

(57) ABSTRACT

An array substrate includes a lower substrate, a switching element and a pixel electrode. In the lower substrate, unit pixel areas are each divided into a plurality of domains. The switching element is disposed on the lower substrate and transmits a pixel signal. The pixel electrode is disposed on the unit pixel area and is electrically connected to the switching element. The pixel electrode includes a plurality of slit portions disposed thereon. A portion of the slit portions is longitudinally extended in a zigzag shape along different directions in correspondence with the domains.

6 Claims, 21 Drawing Sheets

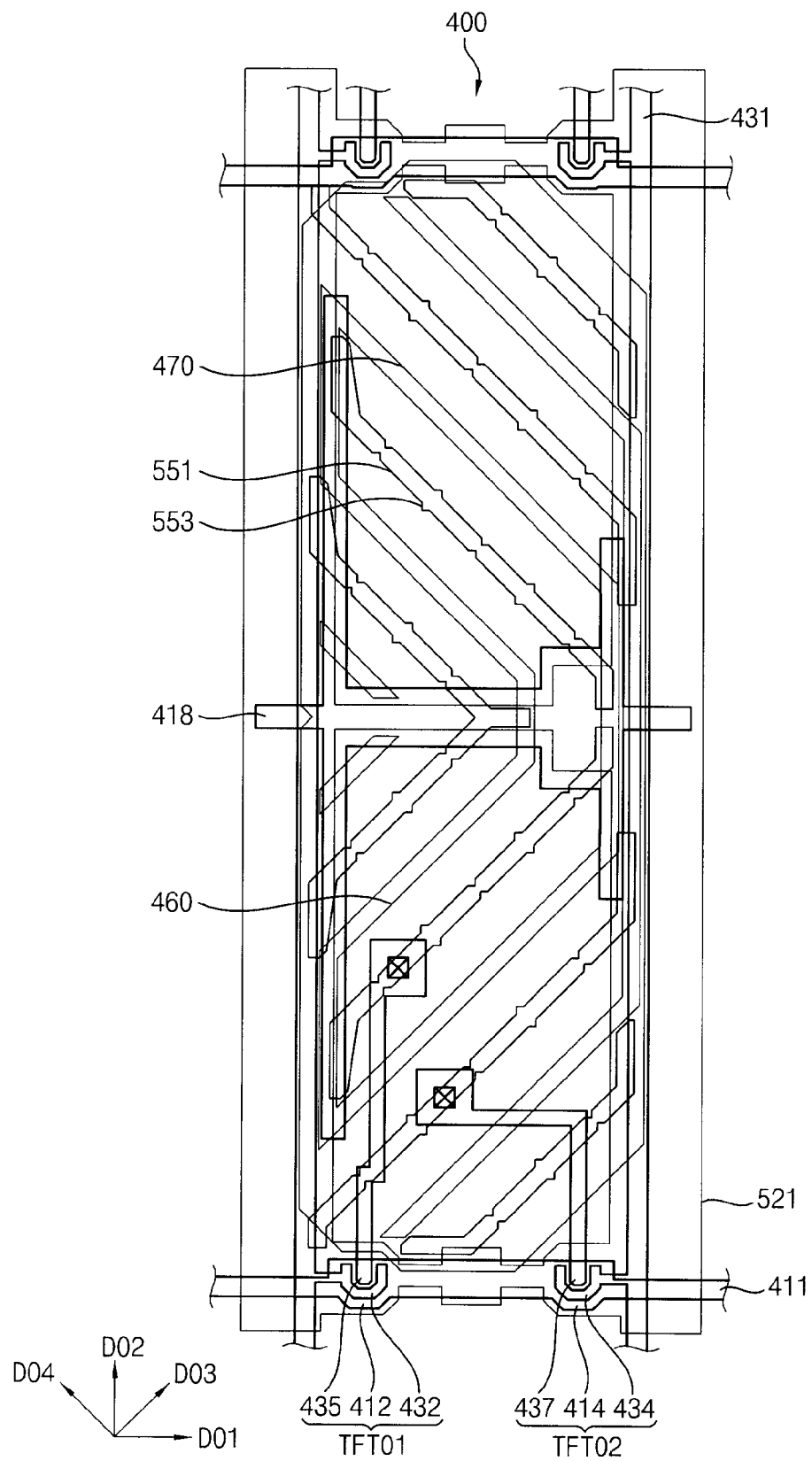

FIG. 11
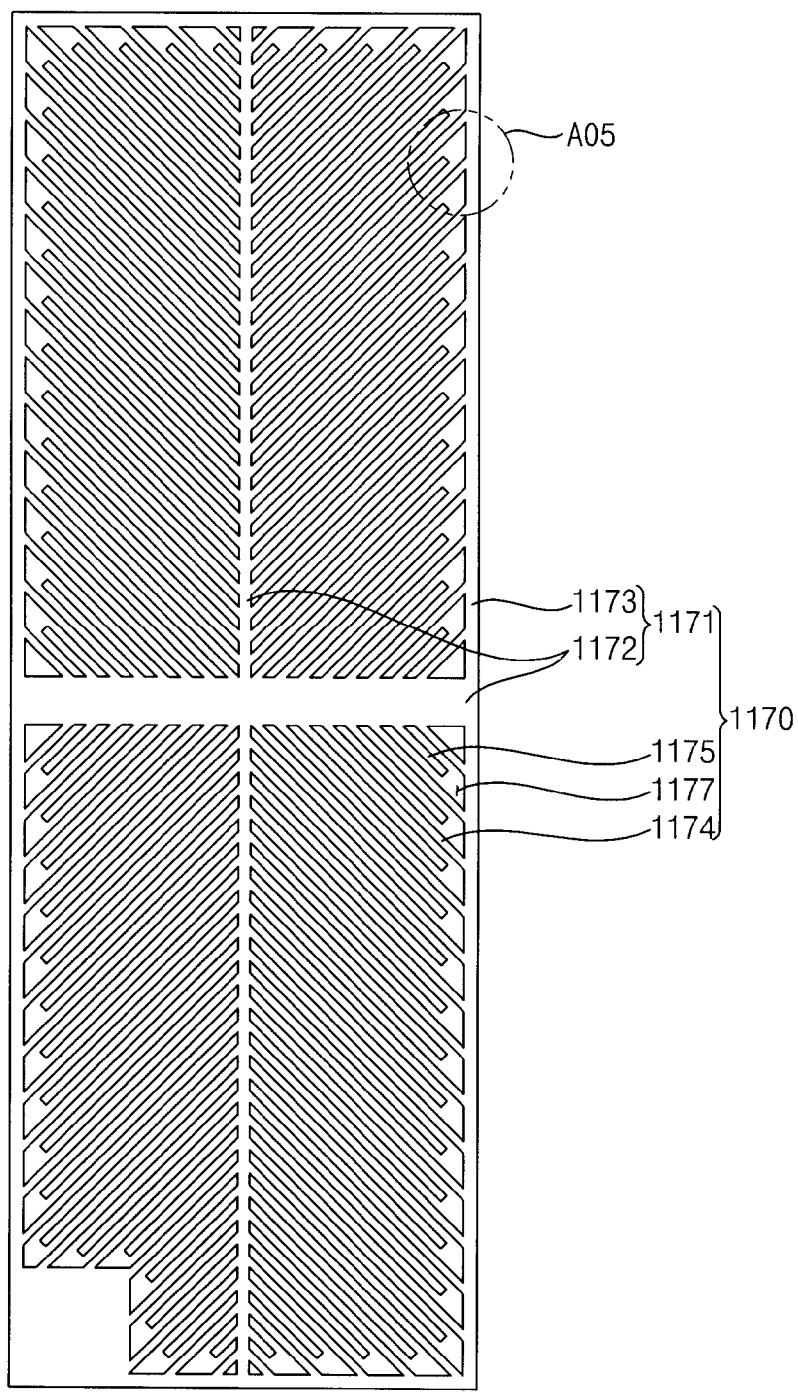
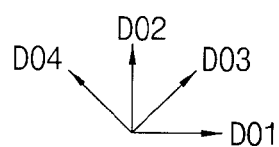

FIG. 15
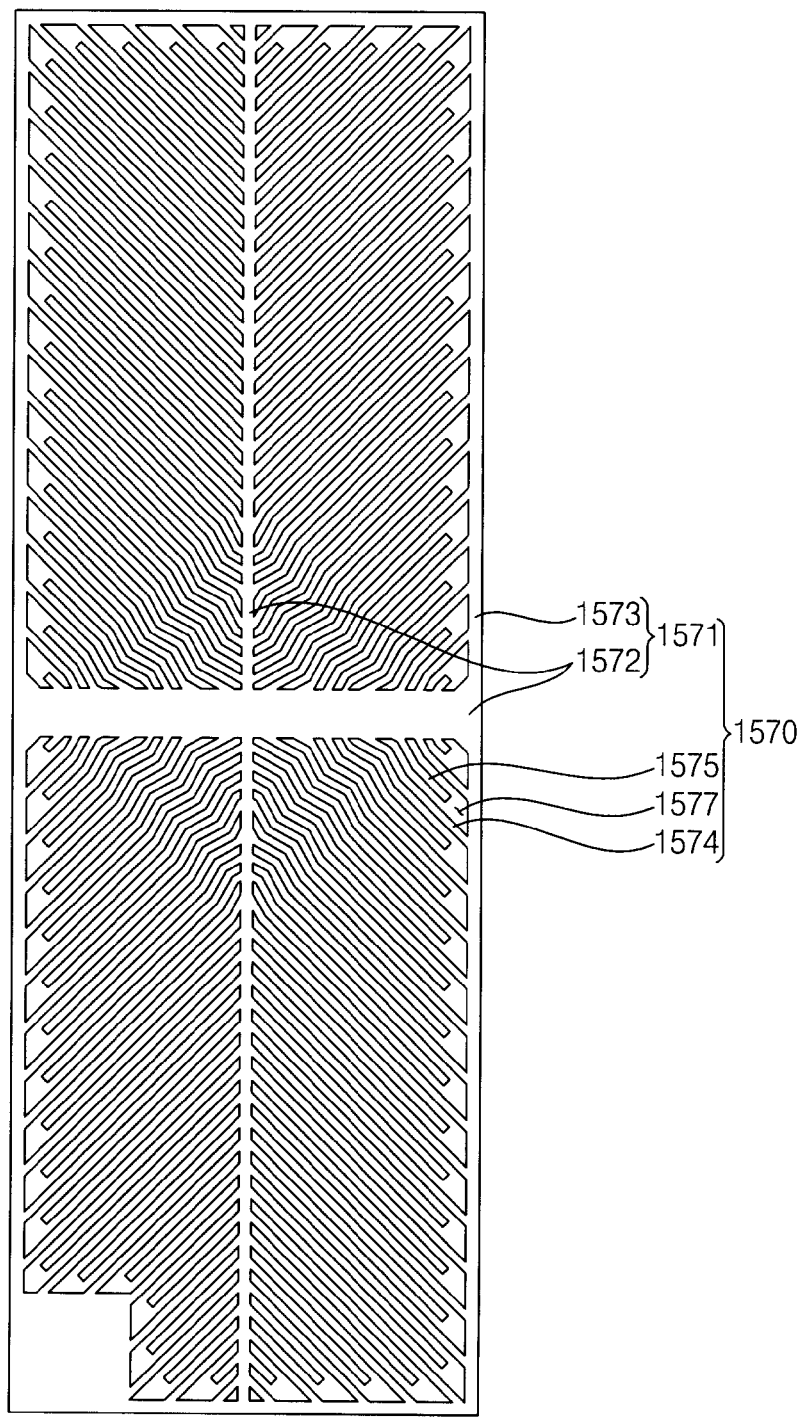
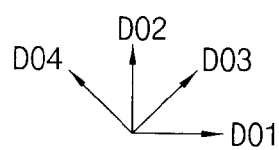

FIG. 16
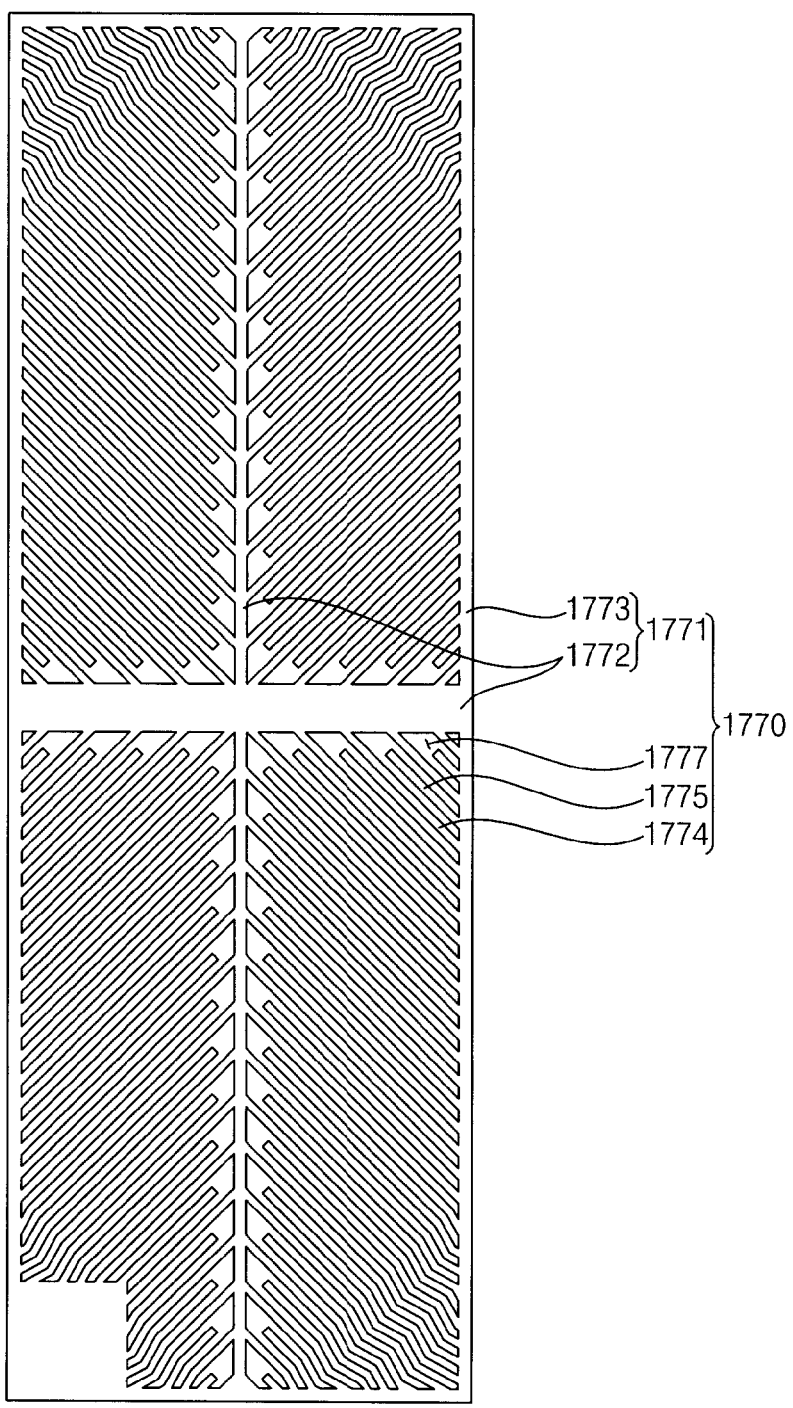
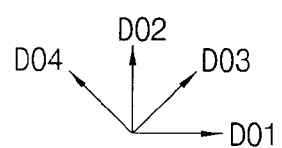

FIG. 17
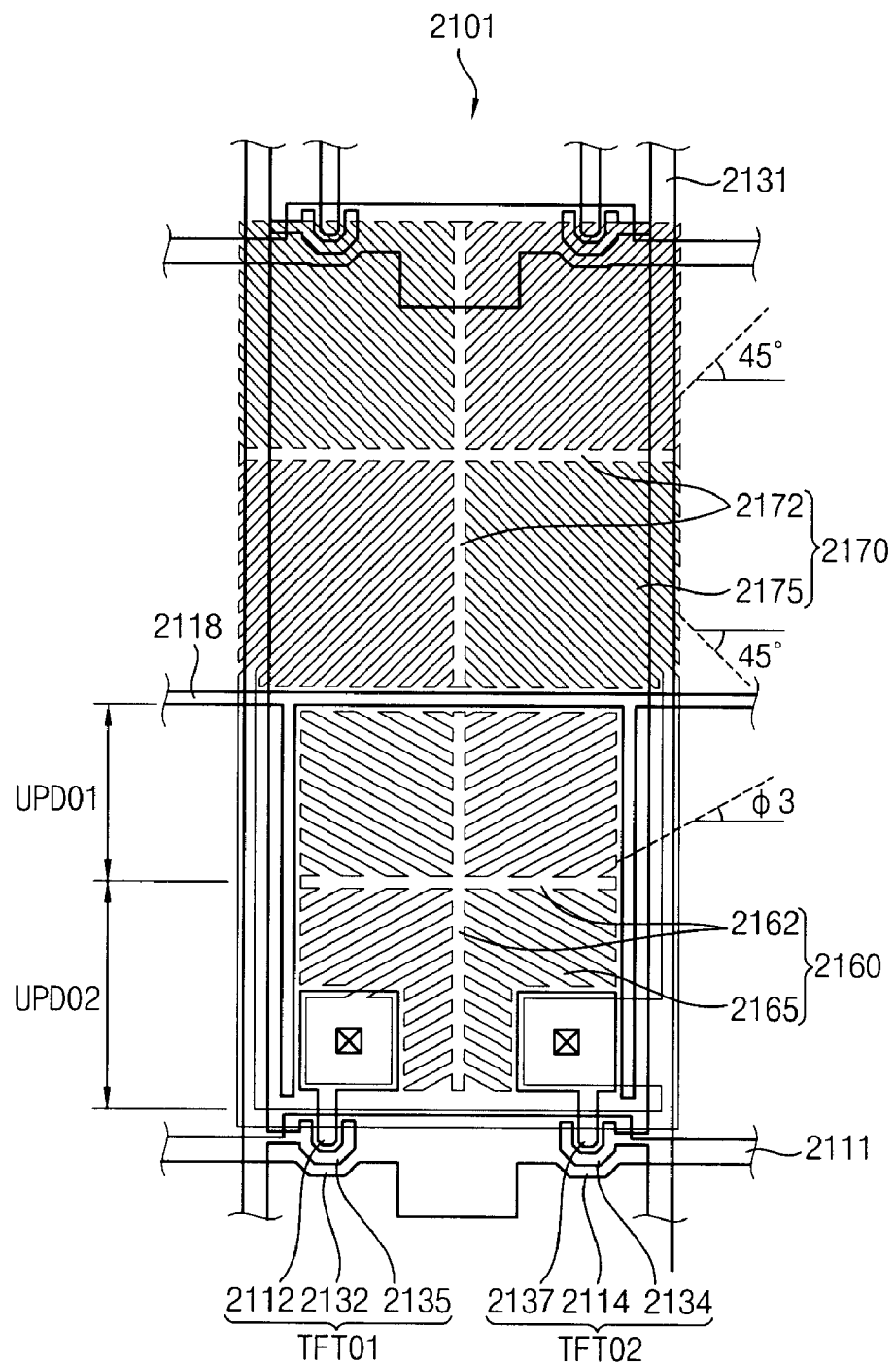
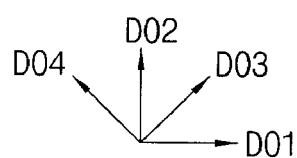

ARRAY SUBSTRATE AND DISPLAY DEVICE HAVING THE SAME

CROSS REFERENCE TO RELATED APPLICATIONS

This application is a continuation of U.S. application Ser. No. 12/494,841, filed on Jun. 30, 2009, which claims priority to Korean Patent Application No. 2008-131915, filed on Dec. 23, 2008, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to an array substrate and a display device including the array substrate. More particularly, exemplary embodiments of the present invention relate to an array substrate in which a plurality of slits is formed on an electrode to control liquid crystal molecules, and a display device including the array substrate.

2. Description of the Related Art

Liquid crystal display ("LCD") devices are one of the most widely used types of flat panel display devices. An LCD device includes two display substrates including electric field generating electrodes such as a pixel electrode, a common electrode, etc. and a liquid crystal layer interposed between the two display substrates. When a voltage is applied to the electric field generating electrodes, the electric field generating electrodes generate an electric field in the liquid crystal layer. The electric field determines the alignment of liquid crystal molecules of the liquid crystal layer, and controls polarized light of incident light to display images.

In a state in which the electric field is not applied, the LCD device of a vertical alignment ("VA") mode arranges the liquid crystal molecules so that long axes of the liquid crystal molecules are substantially perpendicular to the upper and lower display substrates. This method is receiving attention because the contrast ratio of the LCD device of the VA mode is relatively large. In addition, the LCD device of a patterned vertical alignment ("PVA") mode forming a slit portion on the electric field generating electrode of the LCD device of the VA mode to obtain a wide viewing angle has been developed.

In order to reduce the number of the slit portions, which are inhibiting factors in improving an aperture ratio, a micro-slit mode or a super vertical alignment ("SVA") mode has been developed. In the micro-slit mode, a micro-slit is formed only on a lower electrode of the electric field generating electrodes to allow the liquid crystal to have directionality, and the slit portions are not formed on the upper electrode, which is a flat substrate.

However, since controlling the liquid crystal molecules in the LCD devices of the SVA mode and the PVA mode is not uniform, the LCD devices of the SVA mode and the PVA mode may need to have improved side visibility.

BRIEF SUMMARY OF THE INVENTION

Exemplary embodiments of the present invention provide an array substrate adjusting the control efficiency of liquid crystal molecules according to a gray scale to improve side visibility thereof.

Exemplary embodiments of the present invention also provide a display device having the above-mentioned array substrate.

In an exemplary embodiment of the present invention, an array substrate includes a lower substrate, a switching element and a pixel electrode. In the lower substrate, unit pixel areas each divided into a plurality of domains are defined. The switching element is disposed on the lower substrate to transmit a pixel signal. The pixel electrode is disposed on the unit pixel area and electrically connected to the switching element. The pixel electrode includes a plurality of a slit portion disposed thereon. A portion of each of the slit portions is longitudinally extended in a zigzag shape along different directions in correspondence with the domains.

In an exemplary embodiment of the present invention, an array substrate includes a lower substrate, a switching element and a pixel electrode. In the lower substrate, unit pixel areas each divided into a plurality of domains are defined. The switching element is disposed on the lower substrate to transmit a pixel signal. The pixel electrode is disposed on the unit pixel area. The pixel electrode includes a first support electrode part extended along a boundary between the domains, a plurality of first slit portions extended in different directions with respect to each of the domains and disposed continuous with the first support electrode, and a plurality of second slit portions disposed between the first slit portions. An end of the second slit portions is disposed separated from the first support electrode part.

In an exemplary embodiment of the present invention, an array substrate includes a lower substrate, a switching element, first pixel electrodes and second pixel electrodes. In the lower substrate, unit pixel areas each divided into a main pixel area and a sub-pixel area are defined. The switching element is disposed on the lower substrate to transmit a pixel signal. The first pixel electrode is disposed on the main pixel area, and includes a plurality of first slit portions extended in different directions according to each of the domains, the first slit portions each making a first angle with respect to width direction of the unit pixel area. A size of a lower domain of the first pixel electrode and a size of an upper domain of the first pixel electrode adjacent to the sub-pixel area are different from each other. The second pixel electrode is disposed on the sub-pixel area, the second pixel electrode includes a plurality of slit portions extended in different directions from each other and making a second angle with respect to the width direction.

In an exemplary embodiment of the present invention, a display device includes an array substrate, an opposite substrate and a liquid crystal layer. The array substrate includes a pixel electrode symmetrically disposed with respect to a center line substantially parallel to a first direction. The pixel electrode includes a plurality of first slits disposed thereon making a first acute angle greater than or equal to about 45 degrees with respect to the center line. The opposite substrate includes a common electrode facing the pixel electrode. The common electrode includes a plurality of second slits disposed thereon and making a second acute angle greater than or equal to about 45 degrees with respect to the center line. The second slits are disposed between the first slits. The liquid crystal layer is disposed between the array substrate and the opposite substrate. A distance between adjacent first and second slits disposed at both of opposing sides of the center line in a plan view of the display device, varies in a direction from an area adjacent to the center line towards ends of the first and second slits.

In an exemplary embodiment of an array substrate and a display device including the array substrate, a third efficiency of the liquid crystal in a low gray scale and a second efficiency of the liquid crystal in a medium gray scale may be reduced, so that side visibility of the display device may be improved. Advantageously, the display quality of a display device may be improved.

BRIEF DESCRIPTION OF THE DRAWINGS

The above and other features and advantages of the present invention will become more apparent by describing in detailed exemplary embodiments thereof with reference to the accompanying drawings, in which:

FIG. 4 is a plan view illustrating an exemplary embodiment of a pixel electrode of the display device having a chevron structure;

FIG. 11 is a plan view illustrating a pixel electrode of an array substrate according to Exemplary Embodiment 4 of the present invention;

FIG. 15 is a plan view illustrating a pixel electrode of an array substrate according to Exemplary Embodiment 6 of the present invention;

FIG. 16 is a plan view illustrating a pixel electrode of an array substrate according to Exemplary Embodiment 7 of the present invention;

FIG. 17 is a plan view illustrating a pixel of an array substrate according to Exemplary Embodiment 8 of the present invention;

DETAILED DESCRIPTION OF THE INVENTION

Figure 1:
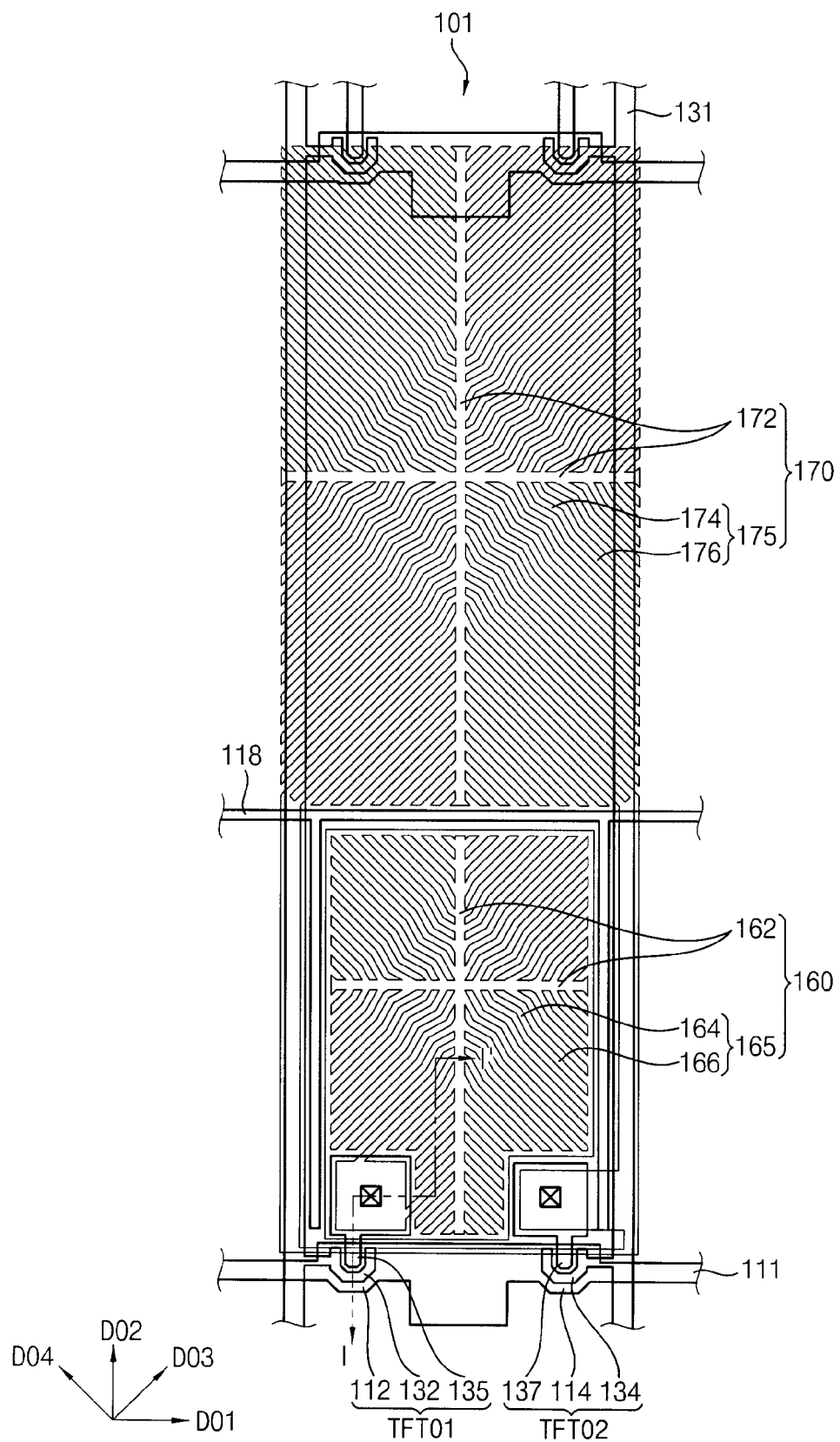
FIG. 1 is a plan view illustrating a unit pixel of an array substrate according to Exemplary Embodiment 1 of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" with respect to other elements or features would then be oriented "upper" with respect to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Exemplary Embodiment 1

Figure 2:
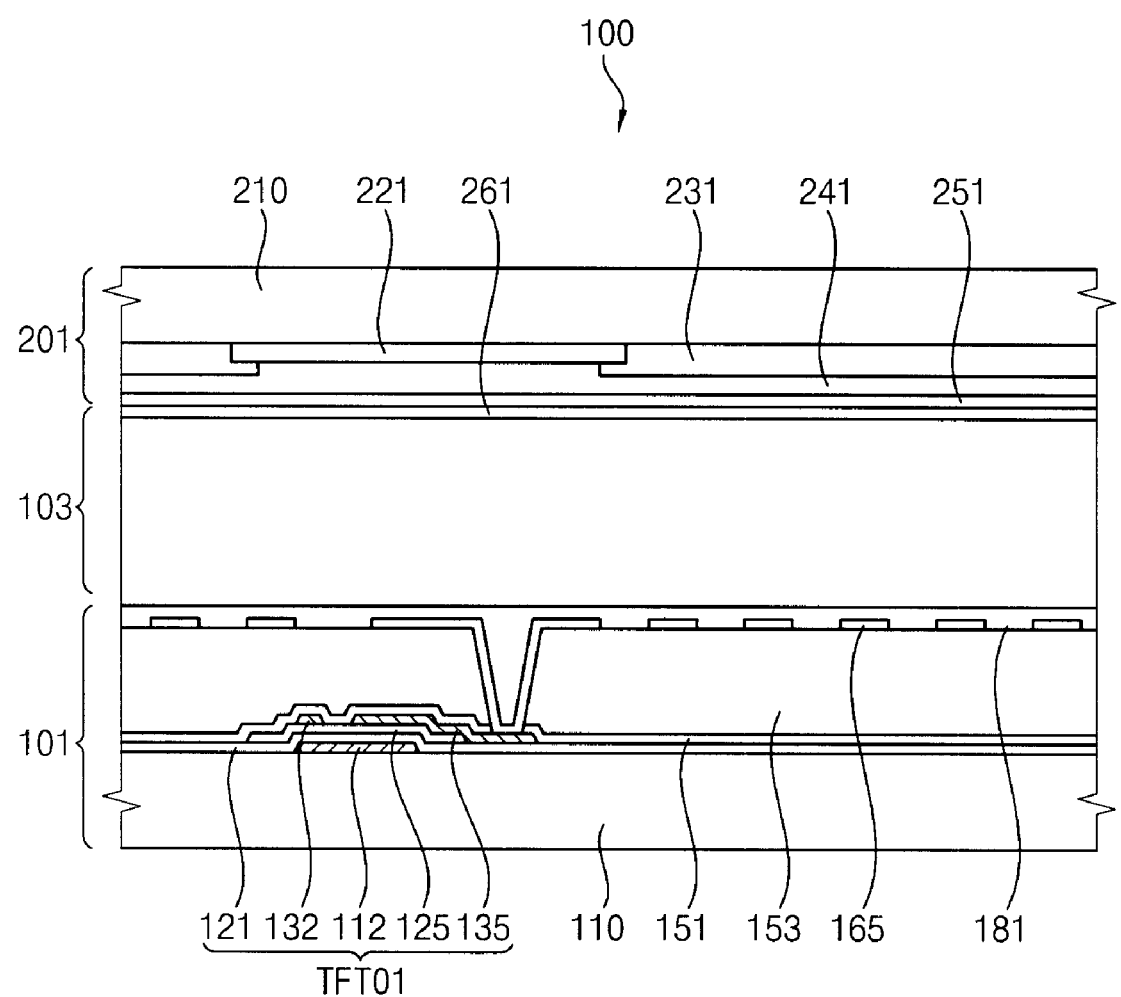
FIG. 2 is a cross-sectional view taken along line I-I' in a display device including the array substrate of FIG. 1.

FIG. 1 is a plan view illustrating a unit pixel of an array substrate according to Exemplary Embodiment 1 of the present invention. FIG. 2 is a cross-sectional view taken along line I-I' in a display device including the array substrate of FIG. 1.

Referring FIGS. 1 and 2, various technologies have been applied to a liquid crystal display ("LCD") device 100 for improving display quality. In the illustrated exemplary embodiment, a plurality of pixel electrode, such as pixel electrodes 160 and 170, to which pixel voltages having different levels from each other are applied, are disposed in each of a unit pixel area of the LCD device 100. In the plan view, the unit pixel area is divided into an upper sub-pixel area and a lower main pixel area. The pixel electrode 160 disposed in the main pixel area refers to a main pixel electrode (which is referred to as a first pixel electrode) 160 and the pixel electrode 170 disposed in the sub-pixel area refers to a sub-pixel electrode (which is referred to as a second pixel electrode) 170, respectively.

In addition, a plurality of a micro slit portion, such as micro slit portions 165 and 175, are disposed on the first pixel electrode 160 and the second pixel electrode 170, respectively, for varying an alignment direction of liquid crystal molecules to improve a viewing angle.

A display device 100 according to Exemplary Embodiment 1 includes an array substrate 101, an opposite substrate 201 and a liquid crystal layer 103 interposed between the array substrate 101 and the opposite substrate 201.

The array substrate 101 may include a lower substrate 110, a plurality of a gate line 111, a plurality of a storage line 118, a gate insulation film 121, an active layer 125, a plurality of a data line 131, a first switching element TFT01, a second switching element TFT02, a passivation film 151, an organic insulation film 153, a plurality of a first pixel electrode 160, a plurality of a second pixel electrode 170 and a lower alignment film 181. The array substrate 101 is provided as an exemplary embodiment, however the array substrate 101 may be alternated with certain substrates including the micro-slit portion (which is referred to as the slit portion) on the pixel electrode.

In an exemplary embodiment of a method of forming an array substrate, a gate metal is deposited on the lower substrate 110 including glass or plastic material, to be etched and form the gate lines 111 and/or the storage line 118. The gate lines 111 are longitudinally extended n a line formed in a substantially width direction (which is referred to as a first direction) D01 of the unit pixel area. The storage line 118 is disposed along a boundary between the main pixel area and the sub-pixel area. The storage line 118 is longitudinally extended substantially parallel with the gate line 111, such as in the first direction D01. The storage line 118 may be disposed between adjacent gate lines 111, in the plan view of the unit pixel area.

The storage line 118 may include storage electrode protruding portions longitudinally extended substantially parallel to a second direction D02, which is inclined with respect to the first direction D01, such as substantially perpendicular with the first direction D01. The storage electrode protruding portions are disposed extending adjacent to an edge of the main pixel area, such as being directly adjacent to a data line 131. The storage electrode protruding portions are continuous with a main portion of the storage line 118 longitudinally extending in the first direction D01. Referring to FIG. 2, the gate insulation film 121 covering (e.g., overlapping) the gate lines 111 and the storage lines 118 is disposed on the lower substrate 110. In the illustrated embodiment, the gate insulation film 121 may be disposed on an entire of the lower substrate 110.

In an exemplary embodiment of a method of forming an array substrate, a semiconductor layer and a source metal layer are sequentially formed on the gate insulation film 121, to be etched, so that the data lines 131, a source electrode 132, a channel layer 125 and a drain electrode 135 are formed, as shown in FIGS. 1 and 2. The data lines 131 are substantially longitudinally extended in the height direction (which is referred to as the second direction) D02 of the unit pixel area and substantially vertical (e.g., perpendicular) with the first direction D01. The source electrode 132 protrudes from the longitudinally extended portion of the data line 131, and is disposed continuous with the data line 131 as illustrated in FIG. 1.

The gate lines 111 are disposed crossing with the data lines 131 to define a substantially rectangular area in the plan view.

In the illustrated embodiment, both the first pixel electrode 160 and the second pixel electrode 170 are disposed in the rectangular area. In an exemplary embodiment, the rectangular area may be considered as defining the unit pixel area, but the present invention is not limited thereto. Alternatively, a shape of the unit pixel area in the plan view may be changed in various forms of Z shape, a V-shape etc., and the unit pixel area may correspond to color filters of an opposing substrate. In exemplary embodiments, a unit pixel area may be broadly defined as an independent are unit capable of independently controlling liquid crystal.

The first switching element TFT01 and the second switching element TFT02 may be defined as an element including three terminals. In the illustrated embodiment, the first switching element TFT01 includes a gate electrode 112, the gate insulation film 121, the channel layer 125, the source electrode 132 and the drain electrode 135. Similarly, the second switching element TFT02 includes a gate electrode 114, the gate insulation film 121, the channel layer 125, a source electrode 134 and a drain electrode 137. The gate electrodes 112 and 114 are disposed continuous with a single gate line 111. The source electrode 134 protrudes from the longitudinally extended portion of the data line 131, and is disposed continuous with the data line 131 as illustrated in FIG. 1. Both the first switching element TFT01 and the second switching element TFT02 are disposed between adjacent data lines 131 in the plan view, and between a gate line 111 and a storage line 118 adjacent to each other.

The passivation film 151 is disposed covering (e.g., overlapping) the data line 131, and the organic insulation film 153 is disposed on the passivation film 151, such that the passivation film 151 is disposed between the organic insulation film 153 and the lower substrate 110. A contact hole exposing a portion of the drain electrode 135 is disposed extending through both the organic insulation film 153 and the passivation film 151. In an alternative exemplary embodiment, the organic insulation film 153 may be omitted.

Figure 3A:
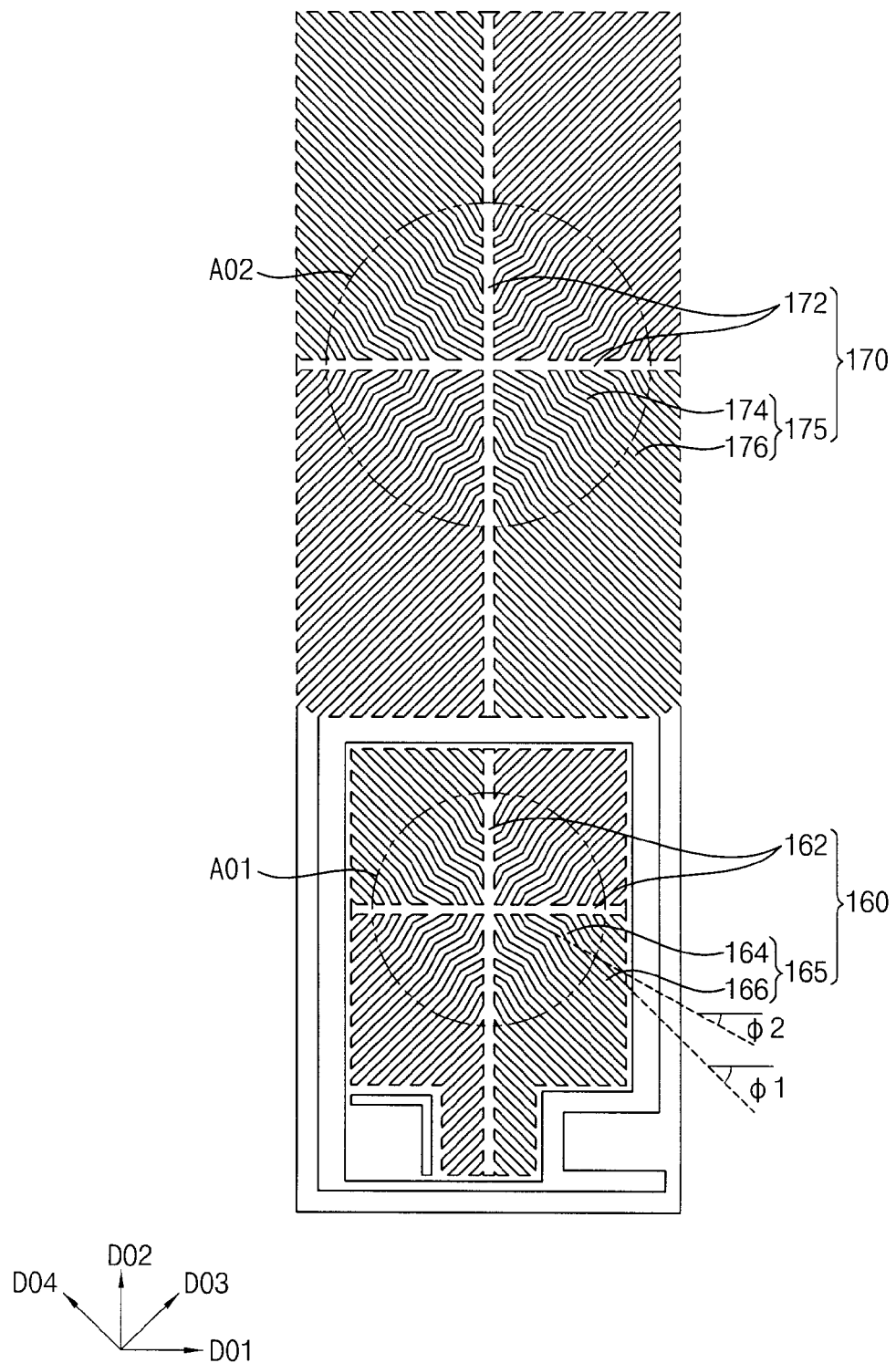
FIG. 3A is a plan view illustrating an exemplary embodiment of a pixel electrode of FIG. 1.

FIG. 3A is a plan view illustrating a pixel electrode of FIG. 1.

Referring to FIGS. 1 to 3, in an exemplary embodiment of a method of forming an array substrate, a transparent conductive material layer such as indium tin oxide ("ITO") or indium zinc oxide ("IZO") is vapor-deposited directly on the organic insulation film 153. The conductive material layer directly contacts the drain electrode 135 through the contact hole. The conductive material layer is etched, so that the first pixel electrode 160 and the second pixel electrode 170 are formed, such that the first pixel electrode 160 and the second pixel electrode 170 are physically and electrically connected to a drain electrode, respectively.

To define a plurality of domains, the first pixel electrode 160 and the second pixel electrode 170 include support electrode parts 162 and 172, and the micro slit portions 165 and 175, respectively.

The support electrode parts 162 and 172 are disposed to have a substantially cross shape in the first direction D01 and the second direction D02, in the plan view. Each of the support electrode parts 162 and 172 includes a first portion longitudinally extended substantially parallel to the first direction D01 and a second portion longitudinally extended substantially parallel to the second direction D02. The micro slit portions 165 and 175 are respectively longitudinally extended substantially in a first oblique line direction DO0, and substantially in a second oblique line direction D04, respectively. The first oblique direction D03 and D04 may each be inclined at about 45 degrees from the support electrode parts 162 and 172 which extend substantially parallel to the first direction D01 and the second direction D02 respectively. In alternative exemplary embodiments, the longitudinal extensions directions of the slit portions 165 and 175 may be differently arranged according to each of the domains. The support electrode parts 162 and 172 and the slit portions 165 and 175 of the first pixel electrode 160 and the second pixel electrode 170 will be described in detail below.

Referring to FIG. 2, in an exemplary embodiment of a method of forming an array substrate, the lower alignment film 181 covering (e.g., overlapping) the first pixel electrode 160 and the second pixel electrode 170 is formed. In one exemplary embodiment, a photoreactive polymer of a cinnamate group and a blend of polymers of a polyimide group are spread and hardened on the first pixel electrode 160 and the second pixel electrode 170, so that the lower alignment film 181 may be formed.

When an electric field is applied, long axes of liquid crystal molecules in the liquid crystal layer 103 are arranged substantially in an extending direction of the slit portions 165 and 175. As a result, the alignment directions of the liquid crystal are different from each other in the plurality of domains, so that the viewing angle of the display device 100 may be advantageously improved.

A lower polarized substrate (not shown) may be attached on a rear surface of the lower substrate 110. Referring to FIG. 2, the rear surface may of the lower substrate 110 may be the lowermost surface of the display device 100. The slit portions 165 and 175 of the first pixel electrode 160 and the second pixel electrode 170 may be longitudinally extended in the directions inclined about 45 degrees or 135 degrees from a lower polarized axis of the lower polarized substrate, such as, the first oblique line direction D03 and the second oblique direction D04.

The opposite substrate 201 may include an upper substrate 210, a light-blocking pattern 221, a color filter pattern 231, an overcoat layer 241, a common electrode 251 and an upper alignment film 261.

The light-blocking pattern 221 is disposed on the upper substrate 210 with correspondence to the gate line 111, the data line 131, the first switching element TFT01, the second switching element TFT02 and the storage line 118. In the illustrated embodiment, the light-blocking pattern 221 overlaps the gate line 111, the data line 131, the first switching element TFT01, the second switching element TFT02 and the storage line 118. The color filter pattern 231 is disposed in portions of the unit pixel area in which light is not blocked, such as portions of the unit pixel area except for or excluding the light-blocking pattern 221.

In an exemplary embodiment, the color filter pattern 231 may include, a red filter, a green filter and a blue filter. The red filter, the green filter and the blue filter may be sequentially disposed with correspondence to each of the unit pixel areas in the first direction D01.

The overcoat layer 241 covers (e.g., overlaps) the color filter pattern 231 and the light-blocking pattern 221, and may be disposed overlapping substantially an entire of the upper substrate 210. The common electrode 251 may include the same material as the first pixel electrode 160 and the second pixel electrode 170. The common electrode 251 is disposed on the overcoat layer 241. In the illustrated embodiment, slit portions, otherwise referred to as incision parts are not disposed on the common electrode 251 corresponding to the unit pixel area, so that the common electrode 251 may be a substantially flat (e.g., planar) member, having substantially continuous planar upper and lower surfaces.

As described in exemplary Embodiment 1, the liquid crystal cell type, where the first pixel electrode 160 and the second pixel electrode 170 include the slit portions 165 and 175, and the common electrode 251 does not include any slit portions as described above, refers to a super vertical alignment ("SVA") mode.

The upper alignment film 261 includes the same material as the lower alignment film 181, and is disposed on the common electrode 251. The upper alignment film 261 defines a lowermost layer of the opposite substrate 201, where the lower alignment film 181 defines an uppermost layer of the array substrate 101, as illustrated in FIG. 2.

The upper polarized substrate (not shown) may be attached on an uppermost surface of the opposite substrate 201, such as an outer surface of the upper substrate 210, and a polarized axis of the upper polarized substrate may be substantially perpendicularly disposed to the polarized axis of the lower polarized substrate.

The liquid crystal layer 103 may be aligned in a direction which the long axis direction (which is referred to as a director of the liquid crystal) of the liquid crystal crosses at right angle to the array substrate 101 and the opposite substrate 201, before the electric field is applied by the first pixel electrode 160 and the second pixel electrode 170 and the common electrode 251.

Referring to FIGS. 1 to 3A again, in exemplary Embodiment 1, the micro slit portions 165 and 175 include first portions which are longitudinally extended in a zigzag shape in areas A01 and A02, which radiate from center portions of the support electrode part 162 and 172, respectively, of the cross shape. The areas A01 and A02 are indicated in FIG. 3A by a broken circle. A center of each of the areas A01 and A02 aligns with an area where the first and second portions of the support electrode part 162 and 172 cross each other, respectively. An outer boundary of the areas A01 and A02 does not extend to an outer boundary of the first pixel electrode 160 and the second pixel electrode 170, respectively. The outer boundary of the areas A01 and A02 is disposed spaced apart from the outer boundary of the first pixel electrode 160 and the second pixel electrode 170, respectively.

In the plan view, remaining second portions of the micro slit portions 165 and 175 disposed in areas of the first pixel electrode 160 and the second pixel electrode 170 excluding areas A01 and A02, are extended to an outer portion (e.g., outer boundary) of the unit pixel areas in a substantially straight line (e.g., linearly shaped). The first portions of the micro slit portions 165 and 175 extended in the zigzag shape are indicated as zigzag portions 164 and 174, and second portions of the micro slit portions 165 and 175 extended substantially linearly are defined as straight line portions 166 and 176 of the first pixel electrode 160 and the second pixel electrode 170, respectively. The first (zigzag) and the second (linear) portions of each of the first pixel electrode 160 and the second pixel electrode 170, are disposed continuous with each other, such that the first pixel electrode 160 and the second pixel electrode 170 are each a single, continuous and indivisible member. A first end of the micro slit portions 165 and 175 may originate at the support electrode part 162 and 172, while a second (distal) end is disposed near the boundary of the first pixel electrode 160 and the second pixel electrode 170, respectively.

Each zigzag portion 164 and 174 of the micro slit portions 165 and 175 bends at least once in the longitudinal direction of the micro slit portions 165 and 175, and within respective area A01 and A02. In the illustrated exemplary embodiment, the zigzag portions 164 and 174 of the micro slit portions 165 and 175 may bend in areas A01 and A02 from one to four times between the support electrode part 162 and 172, and a beginning of the straight line portions 166 and 176 of the micro slit portions 165 and 175. Sub-portions of the zigzag portions 164 and 174 respectively disposed between the first end of micro slit portions 165 and 175, and between bending points along the micro slit portions 165 and 175, are extended substantially linearly.

Figure 3B:
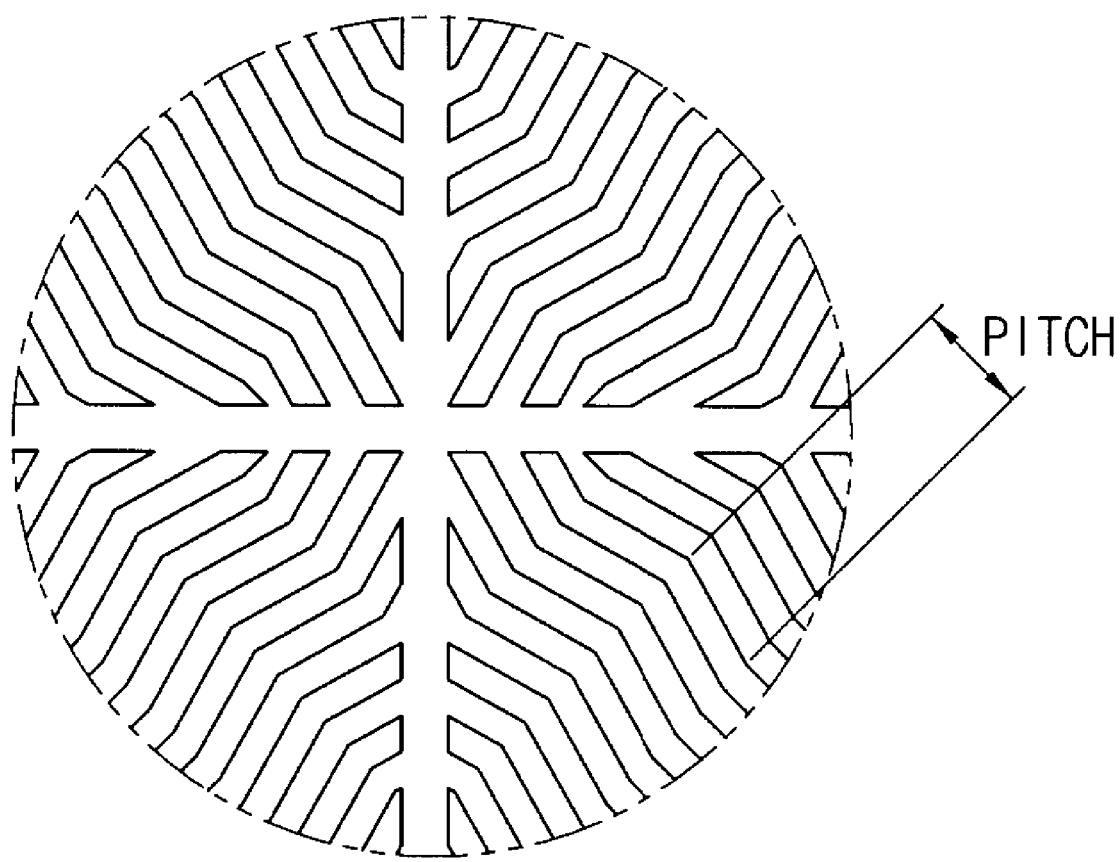
FIG. 3B is a detailed view illustrating a pitch of a zigzag portion of FIG. 3A.

FIG. 3B is a detailed view illustrating a pitch of a zigzag portion of FIG. 3A.

Referring FIG. 1 to FIG. 3B, A pitch which corresponds a one '/' or a one 'reverse /' of a plurality of 'V' s included the zigzag portions 164 and 174, may be in a range of about 10 micrometers (μm) to about 20 micrometers (μm). The pitch may be suitably changed outside the range according to the size of the pixel, or the unit pixel area. The zigzag portions 164 and 174 are extended in the zigzag shape in the plan view, and in a direction of about 45 degrees or about 135 degrees from the lower polarized axis of the lower polarized substrate, while the zigzag portions 164 and 174 are bent in about +15 degrees Φ1 to about −15 degrees Φ2 to the first oblique direction D03 and the second oblique direction D04. A bending angle of the zigzag portions 164 and 174 may be suitably changed outside of the range according to the size of the pixel.

The zigzag portions 164 and 174 control a third efficiency of the liquid crystal described later. The third efficiency refers to arranging the director of the liquid crystal in a direction of about 45 degrees or about 135 degrees from the polarized axis by the electric field applied by the first pixel electrode 160 and the second pixel electrode 170, and the common electrode 251.

In exemplary Embodiment 1, when the LCD device is driven with a relatively low voltage, the third efficiency of the liquid crystal molecules is reduced by the zigzag portions 164 and 174. In addition, when a relatively high voltage is applied to the first pixel electrode 160 and the second pixel electrode 170, all the liquid crystal molecules above (e.g., disposed overlapping) the straight line portions 166 and 176 and the zigzag portions 164 and 174, are arranged in a direction of about 45 degrees or about 135 degrees from the polarized axis, that is, an extended direction of the slit portions 165 and 175, due to the electric field effect. While there is essentially no reducing effect of the transmittance, the third efficiency of the liquid crystal, in the low voltage driving and the high voltage driving, may be controlled.

FIG. 4 is a plan view illustrating an exemplary embodiment of a pixel electrode of a display device 400 having a chevron structure.

An array substrate of the display device 400 may include a lower substrate, a plurality of a gate line 411, a plurality of a storage line 418, a gate insulation film, an active layer, a plurality of a data line 431, a first switching element TFT01, a second switching element TFT02. A light-blocking pattern 521 may be disposed on an upper substrate facing the lower substrate, and overlapping the gate lines 411, the data lines 431, the first switching element TFT01, the second switching element TFT02 and the storage line 418.

The first switching element TFT01 and the second switching element TFT02 may be defined as an element including three terminals. In the illustrated embodiment, the first switching element TFT01 includes a gate electrode 412, the gate insulation film, the channel layer, a source electrode 432 and a drain electrode 435. Similarly, the second switching element TFT02 includes a gate electrode 414, the gate insulation film, the channel layer, a source electrode 434 and a drain electrode 437. The gate electrodes 412 and 414 are disposed continuous with a single gate line 411. The source electrodes 432 and 434 each protrude from a longitudinally extended portion of a data line 431, and are disposed continuous with the data line 431 as illustrated in FIG. 4. Both the first switching element TFT01 and the second switching element TFT02 are disposed between adjacent data lines 431 in the plan view, and between a gate line 411 and a storage line 418 adjacent to each other.

Referring to FIG. 4, first slits 470 are disposed in directions being about 45 degrees or about 135 degrees from the first direction D01 and the second direction D02, such as the first oblique line direction D03 and the second oblique line direction D04 on a pixel electrode 460 in the chevron display device 400. The first slits 470 are disposed so that top and bottom portions of the unit pixel area are substantially symmetrical to each other with respect to the center line of the first direction D01, in the plan view. The pixel electrode 460 is divided into a high pixel and a low pixel by the first slits 470. Such a structure refers to a super patterned vertical alignment ("S-PVA") mode. The high pixel has a substantially V-shape.

Second slits 551 positioned between the first slits 470 are disposed extending in the first oblique line direction D03 or the second oblique direction D04 in the common electrode. Edges of the second slits 551 may include notches 553 disposed therein, to extend from the edge into a body of the common electrode, or from the edge outwardly. In exemplary embodiments, the chevron display device 400 has superior side visibility.

Figure 5:
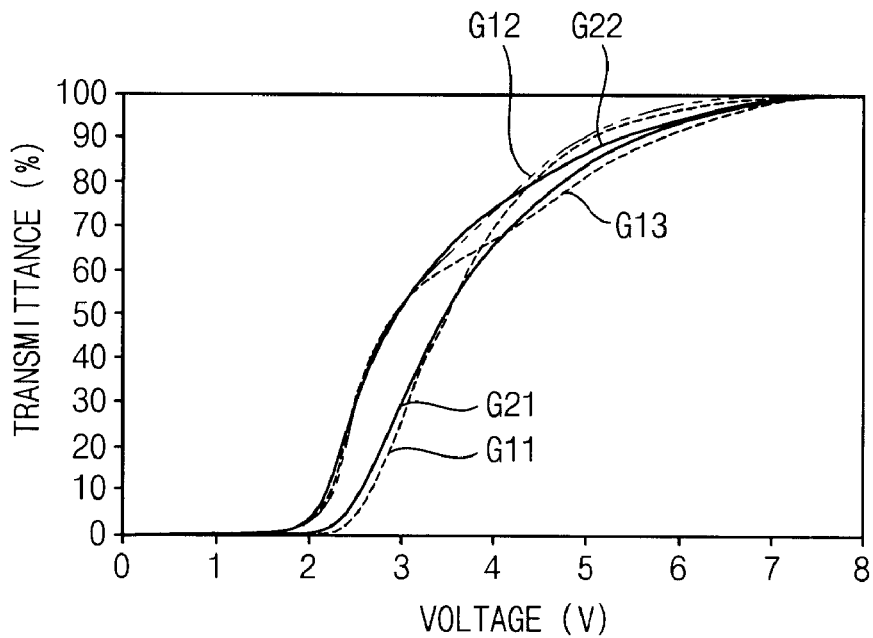
FIG. 5 is an exemplary embodiment of a voltage-transmittance graph for the display device as shown in FIGS. 1 and 2, and the display device having the chevron structure as shown in FIG. 4.
Figure 6:
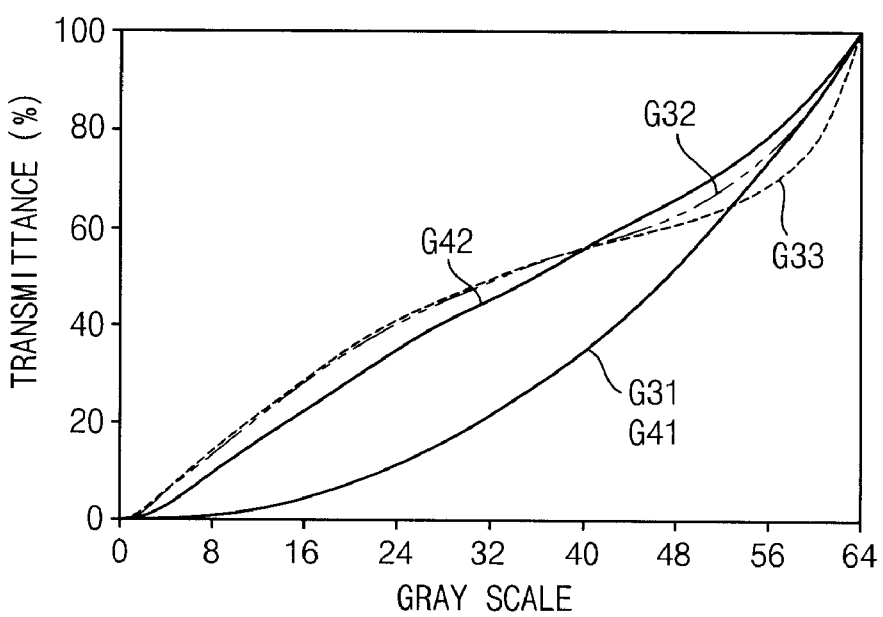
FIG. 6 is an exemplary embodiment of a gray scale-transmittance graph in which the graph of FIG. 5 is converted to a standardized gray scale.

FIG. 5 is an exemplary embodiment of a voltage-transmittance graph for the display device as shown in FIGS. 1 and 2, and the display device having the chevron structure as shown in FIG. 4. FIG. 6 is an exemplary embodiment of a gray scale-transmittance graph in which the graph of FIG. 5 is converted to a standardized gray scale.

In FIGS. 5 and 6, the horizontal axis of the graph represents the voltage applied to the first pixel electrode 160 and the second pixel electrode 170 (FIGS. 1 and 2) and the pixel electrode 460 of the chevron display device 400 (FIG. 4) and the gray scale corresponding to the voltage. The vertical axis of the graph represents the transmittance of the pixel.

In FIG. 5, curve G11 is a V-T result from observing in front of the display device 100 (e.g., a viewing side) of the SVA mode of exemplary Embodiment 1, and curve G12 is a V-T result from observing at a viewing angle of about 60 degrees to the right of the SVA mode of exemplary Embodiment 1. Curve G13 is a V-T result from observing a display device, including the slit portions which are shaped only as a straight line, (e.g., no zigzag portions 164 and 174 of exemplary Embodiment 1), at a viewing angle of about 60 degrees to the right. The display device including the slit portions which are only shaped as the straight line, not the zigzag portions 164 and 174 (as in exemplary Embodiment 1) is defined as a display device of a straight line type or a straight line SVA mode. Curve G21 is a V-T result from observing in front of the display device 400 of the S-PVA mode shown in FIG. 4, and curve G22 is a V-T result from observing the display device 400 of the S-PVA mode at a viewing angle of 60 degrees to the right.

In FIG. 6, curves G31, G32 and G33 represent a gray scale transmittance (G-T) result when viewed from the front, a G-T result at a viewing angle of about 60 degrees to the right and a G-T result at a viewing angle of about 60 degrees to the right of a straight line type SVA mode, according to exemplary Embodiment 1. In addition, curve G41 and G42 represent a G-T result when viewed from the front and a G-T result at a viewing angle of about 60 degrees to the right, according to the chevron display device 400.

Referring to FIG. 5, in the SVA mode according to exemplary Embodiment 1, the transmittance is largely improved, comparing to the transmittance of the S-PVA mode described in FIG. 4. Alternatively, in the S-PVA mode, namely, the chevron structure, the V-T curves of the front and the right similarly increase. However, in the straight SVA mode, the V-T curves of the front and the side illustrate a reversal at about 3.8 V.

Referring to FIG. 6, in the straight line shape SVA mode, the side gamma is greater in the low gray scale, and a side reversal to front is found in the high gray scale more than 50 gray scale, in comparison to the S-PVA mode (namely, the chevron structure).

Accordingly, in the straight line shape SVA mode, it can be seen that the visibility is reduced in comparison to the S-PVA mode. However, in the display device 100 of exemplary Embodiment 1, the reversal disappears in the V-T curves of the front and the side due to the zigzag portion 164 and 174, so that the visibility index may be advantageously improved.

Figure 7:
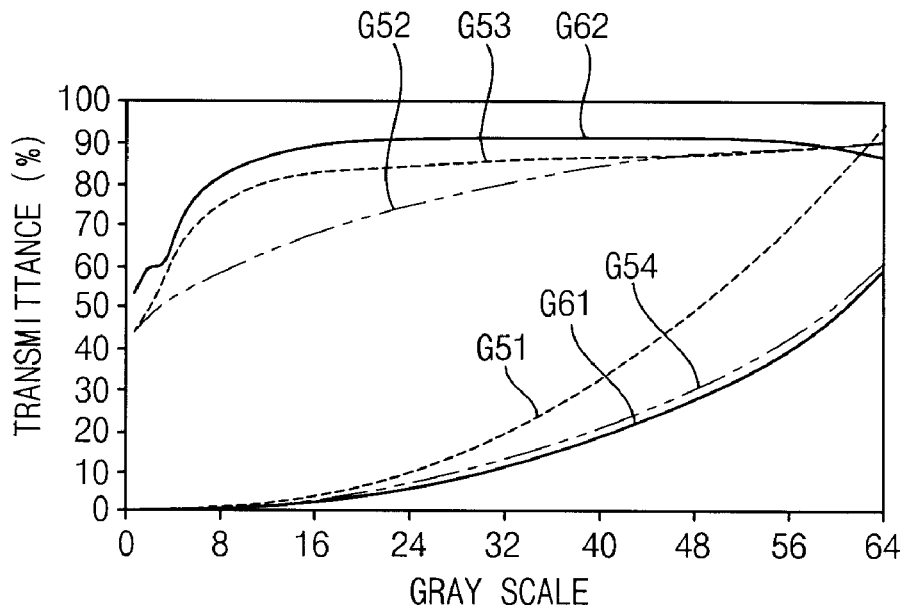
FIG. 7 is a graph showing an exemplary embodiment of a second efficiency and a third efficiency observed in the display device as shown in FIGS. 1 and 2, and the display device as shown in FIG. 4 at a front surface thereof.
Figure 8:
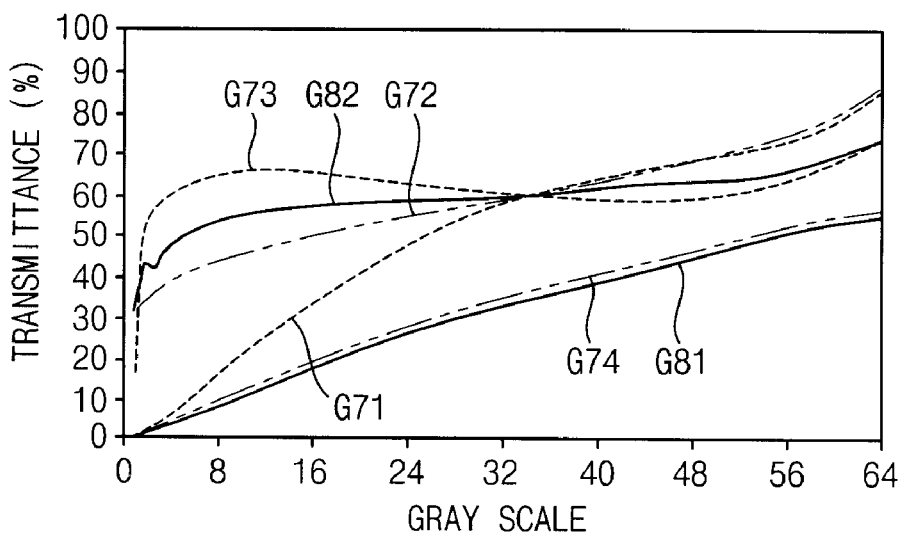
FIG. 8 is a graph showing an exemplary embodiment of a second efficiency and a third efficiency observed in the display device of FIGS. 1 and 2 and the display device described with reference to FIG. 4 at an angle of about 60 degrees to the right.

FIG. 7 is a graph showing an exemplary embodiment of a second efficiency and a third efficiency observed in the display device as shown in FIGS. 1 and 2, and the display device 400 as shown in FIG. 4 at a front surface thereof FIG. 8 is a graph showing an exemplary embodiment of a second efficiency and a third efficiency observed in the display device of FIGS. 1 and 2 and the display device 400 described with reference to FIG. 4, at an angle of 60 degrees to the right.

In FIG. 7, curves G51 and G52 illustrate second and third efficiency results according to the gray scale of the front of the SVA mode of exemplary Embodiment 1, curve G53 illustrates the third efficiency result of the front of the straight line shape SVA mode, and curves G61 and G62 illustrate second and third efficiency results of the front of the chevron display device 400.

In FIG. 8, curves G71 and G72 illustrate second and third efficiency results according to the gray scale of the viewing angle when viewed at an angle of 60 degrees to the right the SVA mode of exemplary Embodiment 1, curve G73 illustrates the third efficiency result when viewed at an angle of 60 degrees to the right of the straight line shape SVA mode, and curves G81 and G82 illustrate second and third efficiency results when viewed at an angle of 60 degrees to the right of the chevron display device 400.

Referring to FIG. 7, it can be seen that an increased slope of the second efficiency of the SVA mode of exemplary Embodiment 1 is relatively rapid and high in comparison to the chevron display device 400. However, it can be seen that there is a negligible difference referring to the third efficiency in the straight line mode and the chevron mode. In the straight line shape SVA mode, the third efficiency increases very rapidly in the low gray scale, and an increasing rate is very small in above the medium gray scale.

In exemplary embodiments, it is preferable that the increasing rate of the third efficiency referring to the gray scale is substantially constant in a visibility view. Accordingly, it is preferable that the curve of the third efficiency is reduced in the low gray scale, in the straight SVA mode. In the illustrated embodiments, the third efficiency is reduced due to the zigzag portions 164 and 174 in the low gray scale, in the SVA mode of exemplary Embodiment 1 as described above. The slope of the curve of the third efficiency of exemplary Embodiment 1 is comparatively constant, on the whole. Advantageously, the visibility of the display device 100 of exemplary Embodiment 1 may be improved.

Referring to FIG. 8, in the curves of the second efficiency and the third efficiency for gray scales when viewed at an angle of 60 degrees to the right, the slope of the second efficiency of the SVA mode display device 100 of exemplary Embodiment 1 similarly increases with the slope of the front. In addition, an inflection point is formed above about 55 gray scale. In the third efficiency for gray scales when viewed at an angle of 60 degrees to the right, the curve of the third efficiency in the SVA mode of exemplary Embodiment 1 is closer to a straight line shape in comparison to curves for the straight line shape SVA mode and the chevron mode. Advantageously, the visibility in the display device 100 of exemplary Embodiment 1 may be improved in comparison to the straight line shape SVA mode and the chevron mode.

Exemplary Embodiment 2

Figure 9:
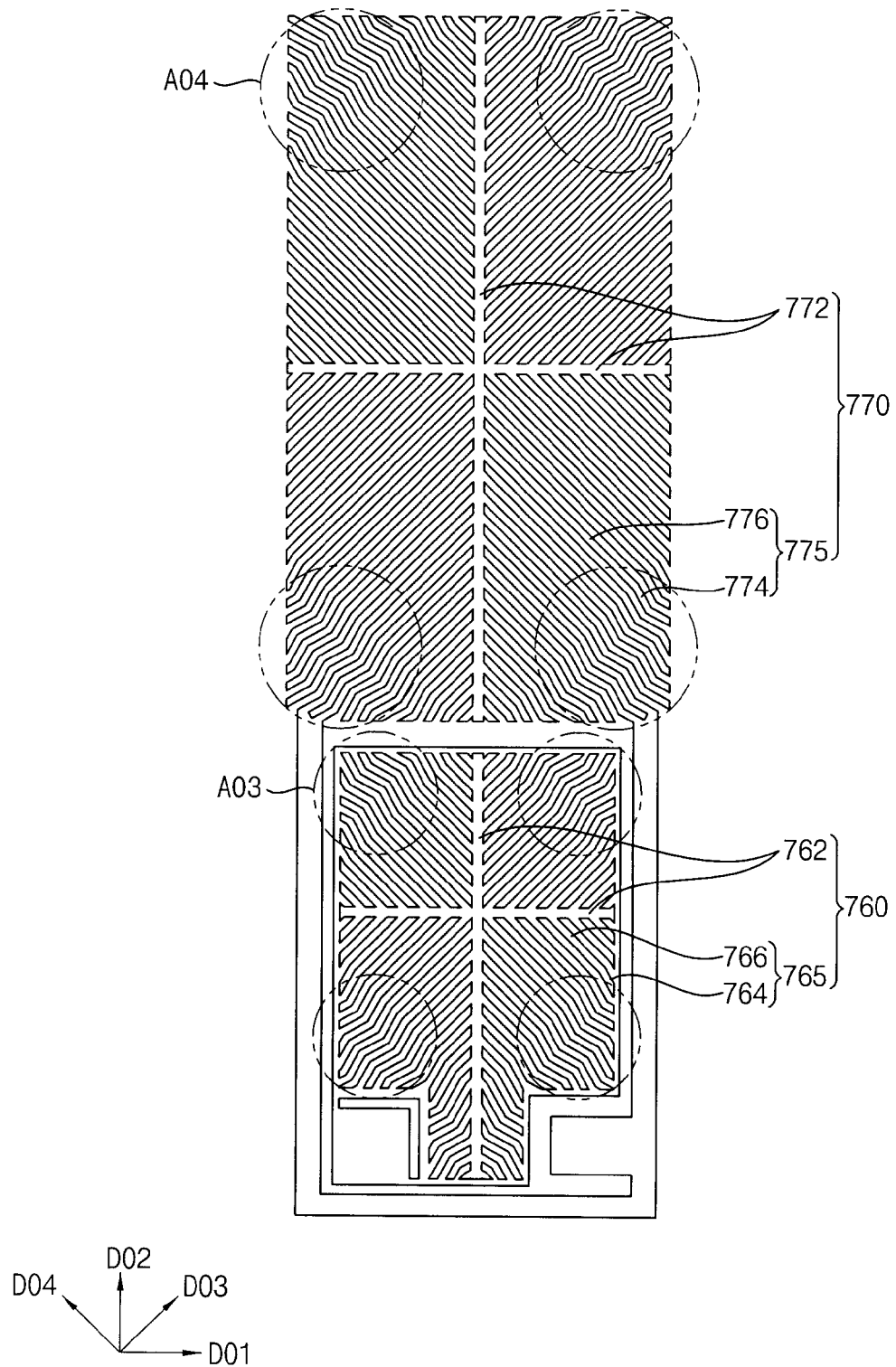
FIG. 9 is a plan view illustrating a pixel electrode of an array substrate according to Exemplary Embodiment 2 of the present invention.

FIG. 9 is a plan view illustrating a pixel electrode of an array substrate according to exemplary Embodiment 2 of the present invention.

Referring to FIG. 9, an array substrate and a display device according to exemplary Embodiment 2 are substantially the same as the array substrate 101 and the display device 100 described in FIGS. 1 to 3, except that positions of zigzag portions 764 and 774 of first slit portions 765 and second slit portions 775 are changed. Accordingly, repetitive explanations will be omitted.

In the plan view, a unit pixel area is divided into an upper sub-pixel area and a lower main pixel area. A pixel electrode 760 disposed in the main pixel area refers to a main pixel electrode (which is referred to as a first pixel electrode) 760, and the pixel electrode 770 disposed in the sub-pixel area refers to a sub-pixel electrode (which is referred to as a second pixel electrode) 770, respectively.

In exemplary Embodiment 2, support electrode parts 762 and 772 are respectively disposed in the main pixel area and the sub-pixel area to have a substantially cross shape. The first slit portion 765 and the second slit portion 775 include straight line portions 766 and 776, and zigzag portions 764 and 774, respectively. First ends of the straight line portions 766 and 776 are extended directly from the support electrode parts 762 and 772 at a center portion of the main pixel area and the sub-pixel area, respectively. The zigzag portions 764 and 774 are extended from second ends opposing the first ends of the straight line portions 766 and 776, with zigzag shape, in areas A03 and A04. The areas A03 and A04 are disposed at corners of the outer portion of the unit pixel area. An outer boundary of the areas A03 and A04 extends to an outer boundary of the first pixel electrode 760 and the second pixel electrode 770, respectively, in contrast to the areas A01 and A02 in exemplary Embodiment 1 shown in FIG. 3A.

The zigzag portions 764 and 774, and the straight line portions 766 and 776 of each of the first pixel electrode 760 and the second pixel electrode 770, are disposed continuous with each other, such that the first pixel electrode 760 and the second pixel electrode 770 are each a single, continuous and indivisible member. A first end of the micro slit portions 765 and 775 may originate at the support electrode part 762 and 772, while a second (distal) end is disposed near the boundary of the first pixel electrode 760 and the second pixel electrode 770, respectively.

Referring to FIG. 9, portions of the first pixel electrode 760 at ends of the support electrode part 762 and 772, may include the first slit portions 765 and second slit portions 775 disposed in a zigzag shape (e.g., bent at least once in an longitudinal direction of the first slit portion 765 and the second slit portion 775). In contrast, portions of the first pixel electrode 160 at ends of the support electrode part 162 and 172 include the micro slit portions 165 and 175 disposed in a substantially linear shape.

The reducing effect of the third efficiency and the increasing effect of side visibility by the same due to the zigzag portions 764 and 774 in a low gray scale are substantially the same as described in FIGS. 1 to 3. Advantageously, the visibility in a display device including the pixel electrode of exemplary Embodiment 2 may be improved.

Exemplary Embodiment 3

Figure 10:
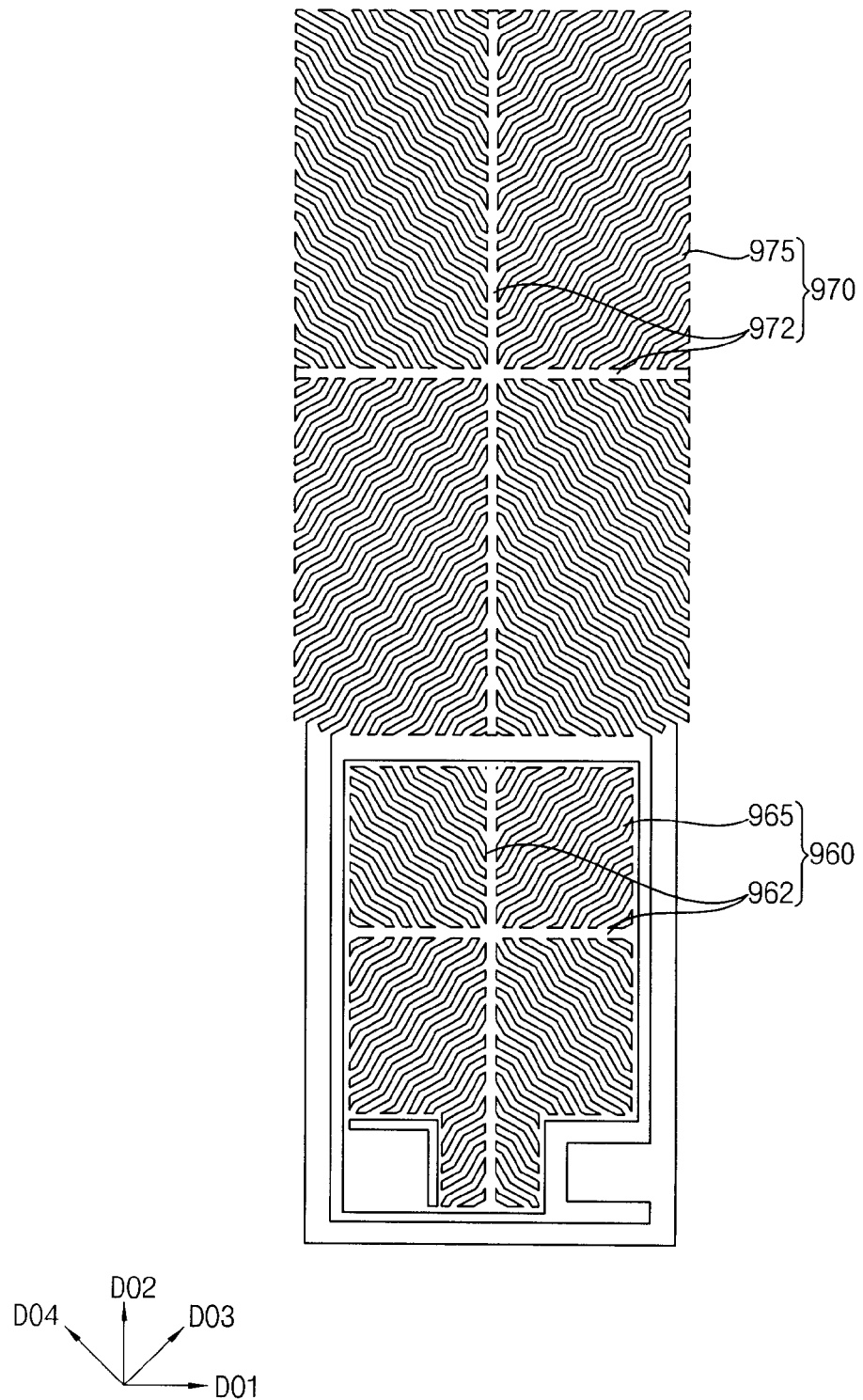
FIG. 10 is a plan view illustrating a pixel electrode of an array substrate according to Exemplary Embodiment 3 of the present invention.

FIG. 10 is a plan view illustrating a pixel electrode of an array substrate according to exemplary Embodiment 3 of the present invention.

Referring to FIG. 10, an array substrate and a display device according to exemplary Embodiment 3 are substantially the same as the array substrate 101 and the display device 100 described in FIGS. 1 to 3, except that all of first slit portions 965 and second slit portions 975 are disposed in the zigzag shape. Accordingly, repetitive explanations will be omitted.

In the plan view, a unit pixel area is divided into an upper sub-pixel area and a lower main pixel area. A pixel electrode 960 disposed in the main pixel area refers to a main pixel electrode (which is referred to as a first pixel electrode) 960, and the pixel electrode 970 disposed in the sub-pixel area refers to a sub-pixel electrode (which is referred to as a second pixel electrode) 970, respectively.

In exemplary Embodiment 3, support electrode parts 962 and 972 are disposed in the main pixel area and the sub-pixel area to have a substantially cross shape, respectively. The first slit portions 965 and the second slit portions 975 are entirely disposed in the zigzag shape.

The reducing effect of the third efficiency and the increasing effect of side visibility by the same due to the first slit portion 965 and the second slit portion 975 having the zigzag shape in the low gray scale are substantially the same as described in FIGS. 1 to 3.

In exemplary Embodiment 3, since the area in which the zigzag is disposed is increased, the reducing effect of the third efficiency due to the first slit portion 965 and the second slit portion 975 having the zigzag shape in the low gray scale may be increased. Accordingly, it may be preferable to make the angle of the zigzag less than those of exemplary Embodiment 1 and exemplary Embodiment 2.

Exemplary Embodiment 4

FIG. 11 is a plan view illustrating an exemplary embodiment of a pixel electrode of an array substrate according to exemplary Embodiment 4 of the present invention.

Referring to FIG. 11, an array substrate and a display device according to exemplary Embodiment 4 are substantially the same as the array substrate and the display device described in FIGS. 1 to 3, except that the shape of the pixel electrode 1170 is changed and the visibility may be improved by adjusting the second efficiency. Accordingly, repetitive explanations will be omitted.

In exemplary Embodiment 4, the pixel electrode 1170 is divided into four domains. The pixel electrode 1170 includes a support electrode part 1171, a first slit portion 1174 and a second slit portion 1175. The support electrode part 1171 includes a first support electrode 1173 and a second support electrode 1172. The first support electrode part 1173 is disposed to an outer portion of the unit pixel area, such as forming an outer boundary around a periphery of the pixel electrode 1170. The second support electrode part 1172 is disposed along a boundary which the domains meet each other, to have a substantially cross shape in the plan view. The support electrode part 1171, the first slit portion 1174 and the second slit portion 1175 are disposed continuous with each other to define a single, continuous and indivisible member of the pixel electrode 1170.

In the illustrated embodiment, the first slit portion 1174 and the second slit portion 1175 are longitudinally extended in the first oblique direction D03 or the second oblique direction D04 in each domain, and are symmetrically arranged between the domains with respect to the second support electrode part 1172. The first slit portion 1174 is connected to the first support electrode 1173 and the second support electrode 1172, such that first and second ends of the first slit portion 1174 is continuous with the first support electrode 1173 and the second support electrode 1172.

In contrast, a second (distal) end of the second slit portion 1175 is separated from the first support electrode part 1173 to be spaced apart from each other, but a first end of the second slit portion 1175 is connected to and continuous with the second support electrode part 1172. The first slit portion 1174 and the second slit portion 1175 are alternately arranged within each of the domains.

An opening portion 1177 is disposed at an outer portion of the unit pixel area, and between the distal end of the second slit portion 1175 and the first support electrode 1173. A width of the opening portion 1177 taken substantially perpendicular to a longitudinal direction of the second slit portion 1175 is larger than a width of the first slit portion 1174 and the second slit portion 1175. A portion of a single continuous opening portion 1177 is disposed adjacent to opposing sides of each second slit portion 1175, such that a series of the opening portion 1177, the first slit portion 1174, the opening portion 1177 and the second slit portion 1175 repeat across each domain.

Figure 12A:
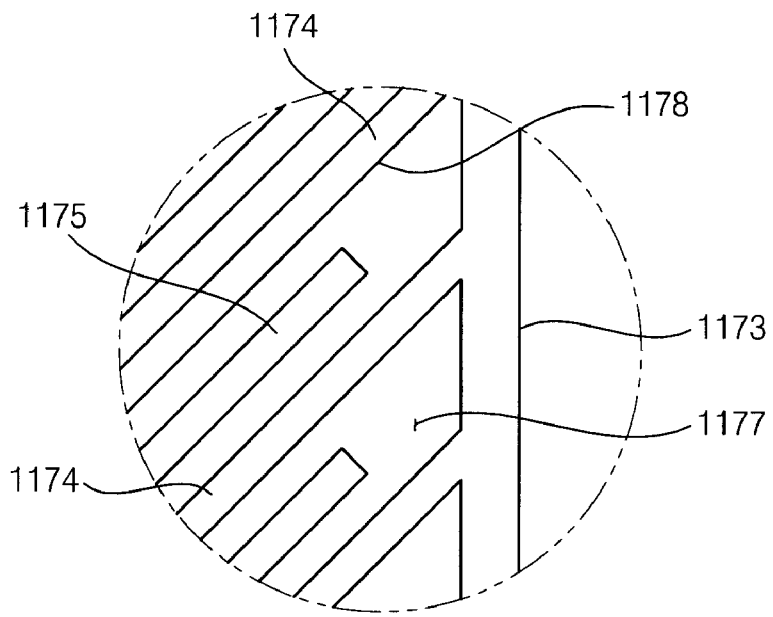
FIG. 12A is an exemplary embodiment of an enlarged plan view illustrating an outer portion area of the pixel electrode of FIG. 11.
Figure 12B:
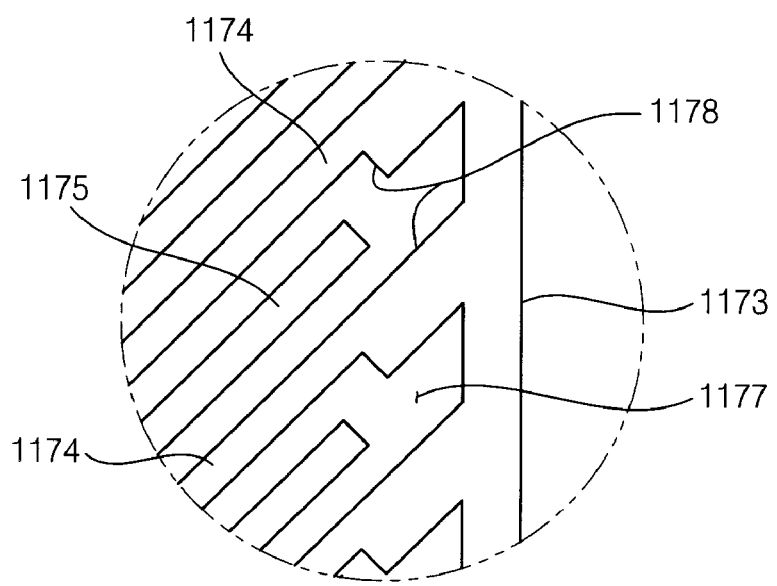
FIGS. 12B to 12D are enlarged plan views illustrating alternative exemplary embodiments of opening portions of a pixel electrode.
Figure 12C:
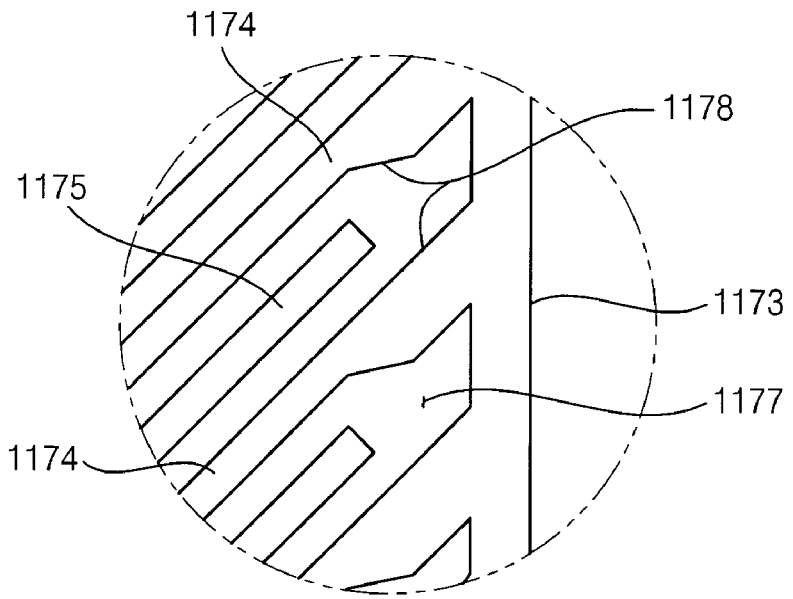
Figure 12D:
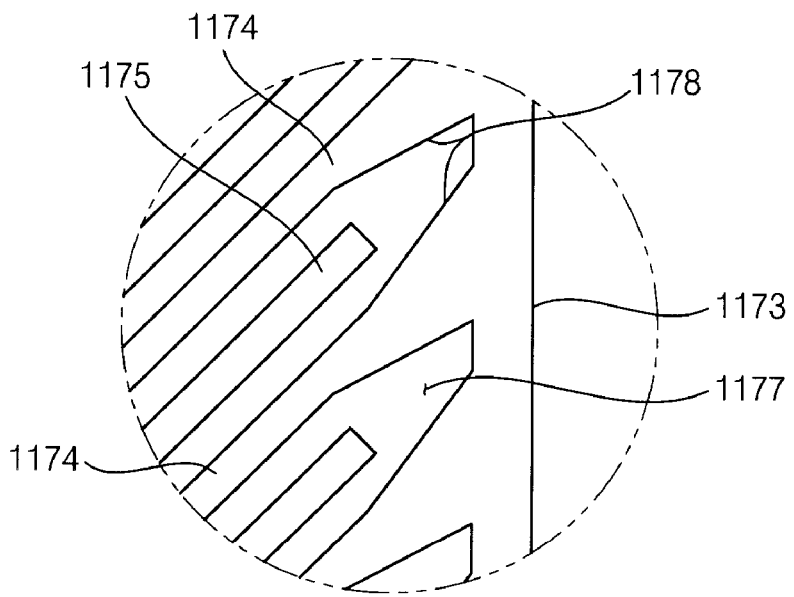
Figure 13:
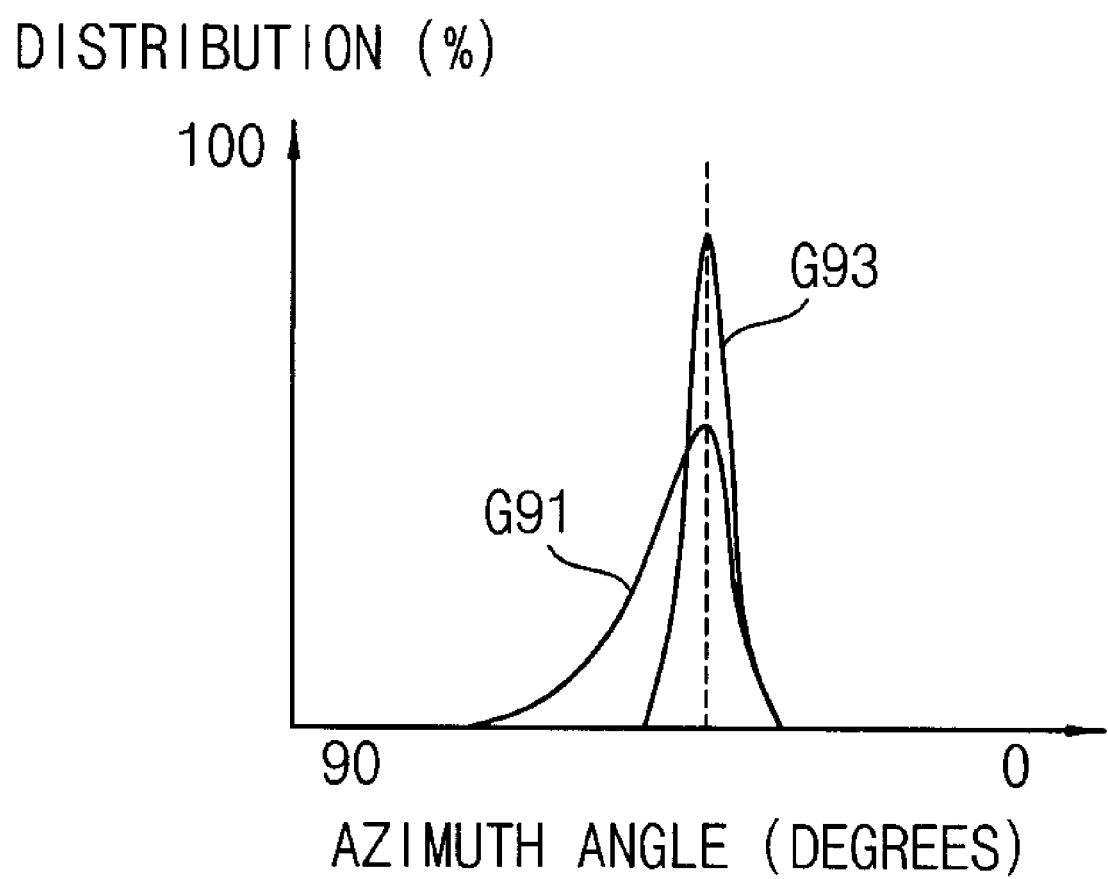
FIG. 13 is a graph showing an exemplary embodiment of a second efficiency in the display device including the pixel electrode of FIG. 11 and the display device of FIG. 4.

FIG. 12A is an enlarged plan view illustrating an exemplary embodiment an outer area of the pixel electrode of FIG. 11 indicated as area A05. FIGS. 12B to 12D are enlarged plan views illustrating alternative exemplary embodiments of opening portions. FIG. 13 is a graph showing an exemplary embodiment of a second efficiency in the display device including the pixel electrode of FIG. 11 and the display device of FIG. 4.

In FIGS. 12B to 12D, alternative exemplary embodiments of the outer area of a pixel electrode where a width of the opening 1177 is smaller than a width shown in FIG. 12A. Where the width of the opening 1177 is too broad, a controlling power of the liquid crystal may be lost. As described above, the width of the opening portion 1177 is taken substantially perpendicular to a longitudinal direction of the second slit portion 1175. Accordingly, it is preferable to narrow the width of the opening 1177 as described in FIGS. 12B to 12D.

As illustrated in FIG. 12A, facing edges 1178 of adjacent first slit portions 1174 in an area adjacent to the first support electrode 1173 at the outer area of the pixel electrode, are substantially linear and perpendicular to each other. A width of the opening 1177 at the distal end of the second slit portion 1175, is substantially the same as the width of the opening 1177 in the area adjacent to the first support electrode 1173 at the outer area of the pixel electrode.

In FIG. 12B, the edge 1178 of one of the adjacent first slit portions 1174 includes a stepped portion in an area adjacent to the first support electrode 1173, which decreases the width of the opening 1177 in the area adjacent to the first support electrode 1173. In FIG. 12C, the edge 1178 of one of the adjacent first slit portions 1174 includes a inclined portion protruded towards the opening 1177 in an area adjacent to the first support electrode 1173, which decreases the width of the opening 1177 in the area adjacent to the first support electrode 1173. In FIG. 12D, the facing edges 1178 of the adjacent first slit portions 1174 are both inclined in a direction towards the first support electrode 1173, which decreases the width of the opening 1177 in the area adjacent to the first support electrode 1173.

In FIG. 13, the horizontal axis of the graph is an azimuth angle of the liquid crystal molecules, and the vertical axis of the graph is a rate of liquid crystal molecules being in the corresponding azimuth angle. Referring to FIG. 13, the width of the second efficiency curve G93 of the described chevron display device 400 is narrower and higher than the width of the second efficiency curve G91 of the display device according to exemplary Embodiment 4. It can be concluded from the result illustrated in FIG. 13, that the second efficiency of the liquid crystal is reduced, due to the opening portion 1177, in the medium gray scale.

The second efficiency refers to a degree to which the direction of the liquid crystal is changed from vertical direction toward horizontal direction by the electric field formed between the pixel electrode 1170 and the common electrode. As illustrated in FIG. 13, the opening portion 1177 weakens the control power of the liquid crystal to control the liquid crystal in a certain state, such as to be not entirely black or not entirely white.

Referring again to FIGS. 7 and 8 again, referring to curve G54 representing the second efficiency in front of the display device, and curve G74 representing the second efficiency of the side of the display device according to exemplary Embodiment 4, it can be seen that the second efficiency is reduced due to the opening portion 1177 in the medium gray scale.

In the display device of exemplary Embodiment 4, it can be observed that the slope of the curve G54 having the rapidly changing slope and the slope of the straight line shape curve G74 having the comparatively constant slope, is substantially close to the second efficiency of the chevron mode, in the second efficiency curve. Accordingly, it can be seen that the second efficiency of exemplary Embodiment 4 is closer to being a straight line shape, so that side visibility may be improved according to exemplary Embodiment 4.

Exemplary Embodiment 5

Figure 14:
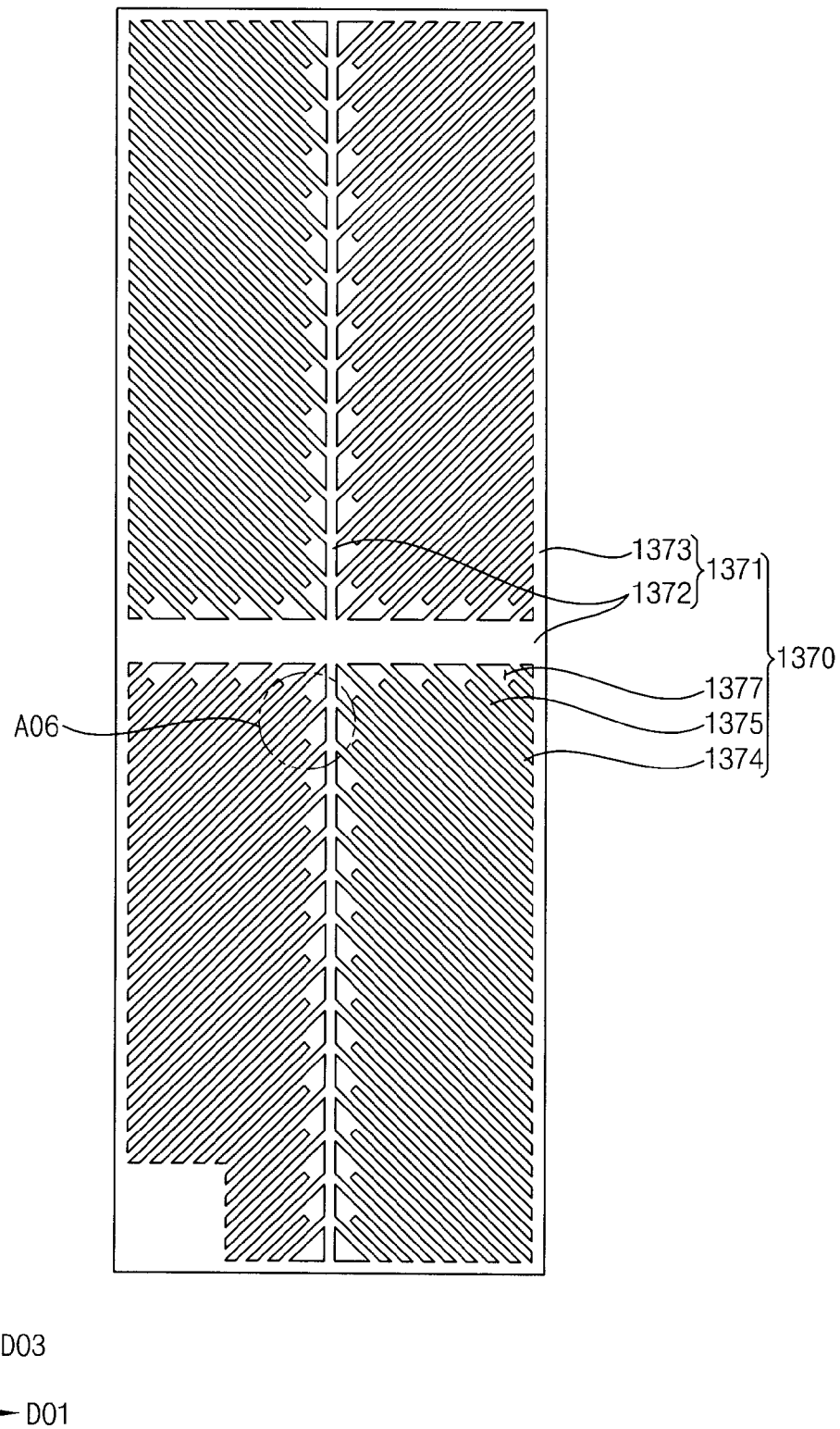
FIG. 14 is a plan view illustrating a pixel electrode of an array substrate according to Exemplary Embodiment 5 of the present invention.

FIG. 14 is a plan view illustrating a pixel electrode of an array substrate according to exemplary Embodiment 5 of the present invention.

Referring to FIG. 14, an array substrate and a display device according to exemplary Embodiment 5 are substantially the same as the array substrate and the display device described in FIGS. 11 to 13, except that the position, on which an opening 1377 is disposed, is changed in the area A06 to be adjacent to the second support electrode part 1372. Accordingly, repetitive explanations will be omitted.

In exemplary Embodiment 5, the pixel electrode 1370 is divided into four domains. The pixel electrode 1370 includes a support electrode part 1371, a first slit portion 1374 and a second slit portion 1375. The support electrode part 1371 includes a first support electrode 1373 and a second support electrode 1372. The first support electrode part 1373 is disposed to an outer portion of the unit pixel area, such as forming an outer boundary around a periphery of the pixel electrode 1370. The second support electrode part 1372 is disposed along a boundary which the domains meet each other, to have a substantially cross shape in the plan view. The support electrode part 1371, the first slit portion 1374 and the second slit portion 1375 are disposed continuous with each other to define a single, continuous and indivisible member of the pixel electrode 1370.

In exemplary Embodiment 5, a first end of the second slit portion 1375 is connected to and continuous with the first support electrode part 1373, and a second (distal) end of the second slit portion 1375 is spaced apart from the second support electrode part 1372. The second ends of the second slit portions 1375 are disposed spaced apart from the second support electrode part 1372 at an inner portion of the unit pixel area. The second support electrode 1372 has a cross shape and serves to divide the unit pixel area into a plurality of domains. The opening portion 1377 is disposed between the second (distal) end of the second slit portion 1375 and the second support part 1372. The opening portion 1377 is substantially arranged along and directly adjacent to the cross in the unit pixel area formed by the second support electrode 1372. The reducing effect of the second efficiency and the increasing effect of side visibility by the same, due to the opening portion 1377 in the medium gray scale, are substantially the same as the described in FIGS. 11 to 13. Accordingly, repetitive explanations will be omitted.

Exemplary Embodiment 6

FIG. 15 is a plan view illustrating a pixel electrode of an array substrate according to exemplary Embodiment 6 of the present invention.

Referring to FIG. 15, an array substrate and a display device according to exemplary Embodiment 6 are substantially the same as the array substrate and the display device described in FIGS. 11 to 13, except that portions of a first slit portion 1574 and a second slit portion 1575 are disposed in the zigzag shape. Accordingly, repetitive explanations will be omitted.

In exemplary Embodiment 6, the pixel electrode 1570 is divided into four domains. The pixel electrode 1570 includes a support electrode part 1571, the first slit portion 1574 and the second slit portion 1575. The support electrode part 1571 includes a first support electrode 1573 and a second support electrode 1572. The support electrode part 1571, the first slit portion 1574 and the second slit portion 1575 are disposed continuous with each other to define a single, continuous and indivisible member of the pixel electrode 1570.

In exemplary Embodiment 6, the first slit portion 1574 and the second slit portion 1575 are partially disposed in the zigzag shape in areas to the center portion of a second support electrode part 1572 of the cross shape, and are connected to and continuous with the second support electrode part 1572. The first slit portion 1574 is connected to and continuous with both the first support electrode part 1573 disposed to the outer portion of the unit pixel area, and the second support electrode part 1572. A first end of the second slit portion 1575 is disposed continuous with the second support electrode part 1572, and a second (distal) end of the second slit portion 1575 is disposed separated from the first support electrode 1573, to be spaced apart from each other.

An opening portion 1577 is disposed between the second end of the second slit portion 1575 and the first electrode support part 1573. The reducing effect of the second efficiency and the increasing effect of side visibility by the same, due to the opening portion 1577 in the medium gray scale, are substantially the same as the described in FIGS. 11 to 13. Accordingly, repetitive explanations will be omitted.

In addition, since the first slit portion 1574 and the second slit portion 1575 are partially disposed in the zigzag shape, the reducing effect of the third efficiency and the increasing effect of side visibility by the same in the low gray scale are substantially the same as described in FIGS. 1 to 8. Advantageously, the array substrate and the display device of exemplary Embodiment 6 reduce the third efficiency of the liquid crystal in the low gray scale and the second efficiency of the liquid crystal in the medium gray scale, so that side visibility may be improved.

Exemplary Embodiment 7

FIG. 16 is a plan view illustrating a pixel electrode of an array substrate according to exemplary Embodiment 7 of the present invention.

Referring to FIG. 16, an array substrate and a display device according to exemplary Embodiment 7 are substantially the same as the array substrate and the display device described in FIGS. 11 to 13, except that portions of a first slit portion 1774 and a second slit portion 1775 are disposed in the zigzag shape. Accordingly, repetitive explanations will be omitted.

In exemplary Embodiment 7, the pixel electrode 1770 is divided into four domains. The pixel electrode 1770 includes a support electrode part 1771, the first slit portion 1774 and the second slit portion 1775. The support electrode part 1771 includes a first support electrode 1773 and a second support electrode 1772. The support electrode part 1771, the first slit portion 1774 and the second slit portion 1775 are disposed continuous with each other to define a single, continuous and indivisible member of the pixel electrode 1770.

In exemplary Embodiment 7, the first slit portion 1774 and the second slit portion 1775 are partially disposed with zigzag shape in areas adjacent to corners of the outer portion of the unit pixel area, and are connected to and continuous with the first support electrode part 1773. The first slit portion 1774 is connected to and continuous with both the first support electrode part 1773 and the second support electrode 1772 of the cross shape. A first end of the second slit portion 1775 is continuous with the first support electrode part 1173, and a second (distal) end of the second slit portion 1775 is separated from the second support electrode 1772 to be spaced apart from each other.

The reducing effect of the second efficiency and the increasing effect of side visibility by the same, due to an opening portion 1777 in the medium gray scale, are substantially the same as the described in FIGS. 11 to 13. Accordingly, repetitive explanations will be omitted.

In addition, since the first slit portion 1774 and the second slit portion 1775 partially have the zigzag shape, the reducing effect of the third efficiency and the increasing effect of side visibility by the same in the low gray scale are substantially the same as described in FIGS. 1 to 8. Advantageously, the array substrate and the display device of exemplary Embodiment 7 reduces the third efficiency of the liquid crystal in the low gray scale and the second efficiency of the liquid crystal in the medium gray scale, so that side visibility may be improved.

Exemplary Embodiment 8

FIG. 17 is a plan view illustrating a pixel of an array substrate according to exemplary Embodiment 8 of the present invention.

Referring to FIG. 17, an array substrate 2101 and a display device according to exemplary Embodiment 8 are substantially the same as the array substrate 101 and the display device 100 of previously described exemplary embodiments, except that a whole of a first slit portion 2165 and a second slit portion 2175 are disposed extending substantially linearly, areas of top domain UPD01 and the bottom domain UPD02 are different from each other in a main pixel area, and an angle Φ3 of the first slit portion 2165 from the first direction D01 is less than about 45 degrees. Accordingly, repetitive explanations will be omitted.

In the plan view, the unit pixel area is divided into an upper sub-pixel area and a lower main pixel area. The pixel electrode 2160 disposed in the main pixel area refers to a main pixel electrode (which is referred to as a first pixel electrode) 2160 and the pixel electrode 2170 disposed in the sub-pixel area refers to a sub-pixel electrode (which is referred to as a second pixel electrode) 2170, respectively. To define the plurality of domains, the first pixel electrode 2160 and the second pixel electrode 2170 include support electrode parts 2162 and 2172, and the first and second slit portions 2165 and 2175, respectively.

The array substrate 2101 may include a lower substrate, a plurality of a gate line 2111, a plurality of a storage line 2118, a gate insulation film, an active layer, a plurality of a data line 2131, a first switching element TFT01, a second switching element TFT02, a passivation film, an organic insulation film, a plurality of the first pixel electrode 2160, a plurality of the second pixel electrode 2170 and a lower alignment film.

The first switching element TFT01 and the second switching element TFT02 may be defined as an element including three terminals. In the illustrated embodiment, the first switching element TFT01 includes a gate electrode 2112, the gate insulation film, the channel layer, the source electrode 2132 and the drain electrode 2135. Similarly, the second switching element TFT02 includes a gate electrode 2114, the gate insulation film, the channel layer, a source electrode 2134 and a drain electrode 2137. The gate electrodes 2112 and 2114 are disposed continuous with a single gate line 2111. The source electrode 2134 protrudes from the longitudinally extended portion of the data line 2131, and is disposed continuous with the data line 2131 as illustrated in FIG. 17. Both the first switching element TFT01 and the second switching element TFT02 are disposed between adjacent data lines 2131 in the plan view, and between a gate line 2111 and a storage line 2118 adjacent to each other.

Figure 18:
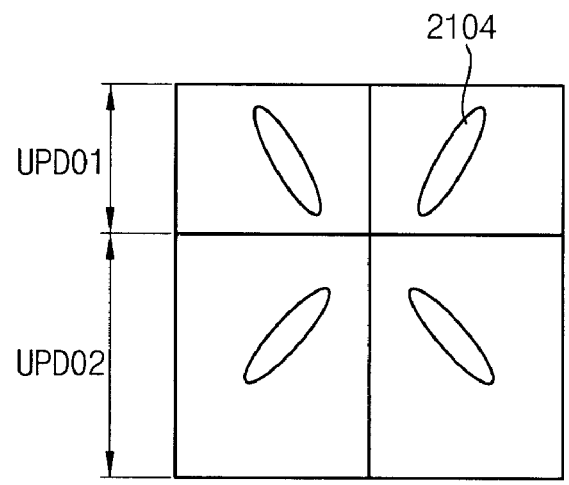
FIG. 18 is a diagram illustrating an exemplary embodiment of directions of liquid crystal molecules and the size of domains in a main pixel area of FIG. 17.
Figure 19:
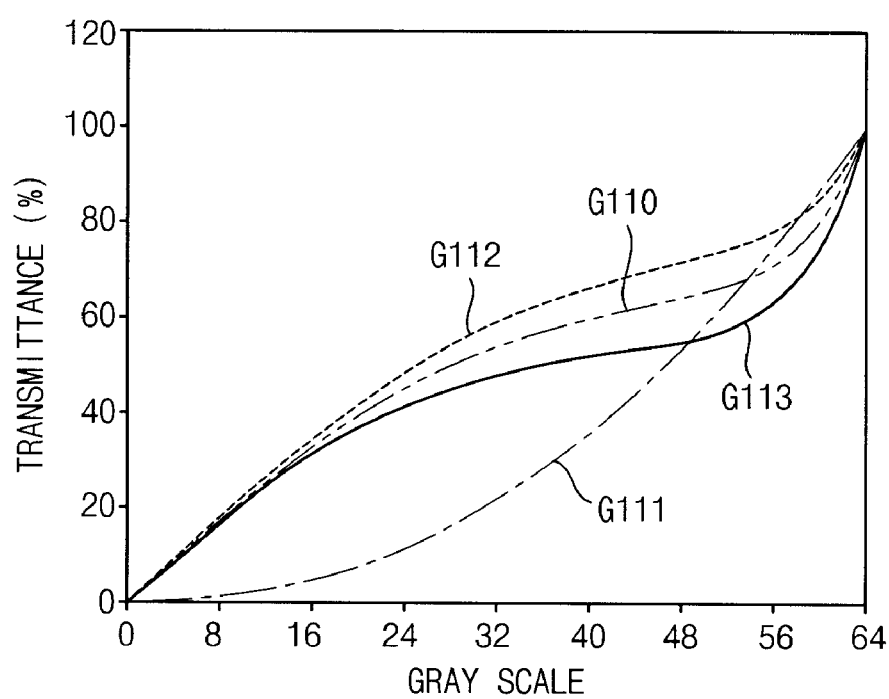
FIG. 19 is an exemplary embodiment of a gray scale-transmittance graph in accordance with a direction of observing the main pixel area of FIG. 18.

FIG. 18 is a diagram illustrating directions of liquid crystal molecules and the size of domains in a main pixel area of FIG. 17. FIG. 19 is a gray scale-transmittance graph in accordance with a direction of observing the main pixel area of FIG. 18.

Referring to FIG. 18, a planar area of a lower domain UPD02 in the main pixel area is larger than an area of an upper domain UPD01 directly adjacent to the sub-pixel area, as shown in FIG. 18.

FIG. 18 schematically represents an exemplary embodiment of a ratio of areas of the top domain UPD01 and bottom domain UPD02 of the main pixel area. The graph shown in FIG. 19 illustrates an exemplary embodiment of an observed result of the gray scale transmittance according to the ratio of the areas of the top and bottom domains. In the FIG. 19, curve G110 is a G-T result from observing the main pixel area at the viewing angle of the upper side and the lower side 60 degrees, when the ratio of the areas is 5:5. Curve G111 is a G-T result from observing in front of the main pixel area, regardless of the ratio of the areas. Curve G112 is a G-T result from observing the main pixel area at the viewing angle of the bottom side 60 degrees, when the ratio of the areas is 4:6. Curve G113 is a G-T result from observing the main pixel area at a viewing angle of 60 degrees toward the top, when the ratio of the areas is 4:6.

As shown in FIG. 18, when the area of the two domains when viewed from the top is narrowed and the area of the two domains of the bottom side is widened, forms of gamma (γ) curves observed from the top and bottom are made to differ. Specifically, the gamma curve from the top is changed into a darker side and the gamma curve in the bottom side is changed into a brighter side.

Figure 20:
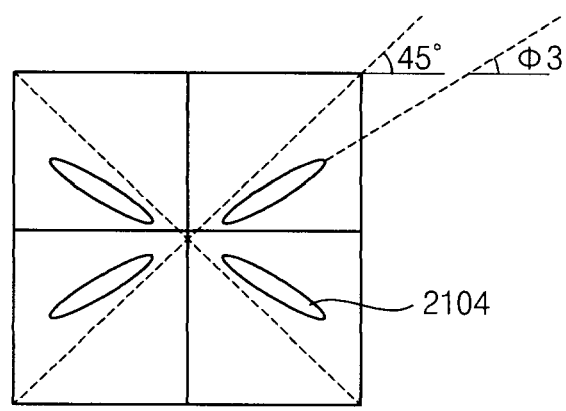
FIG. 20 is a diagram illustrating an exemplary embodiment of directions of liquid crystal molecules in the main pixel area of FIG. 18.
Figure 21:
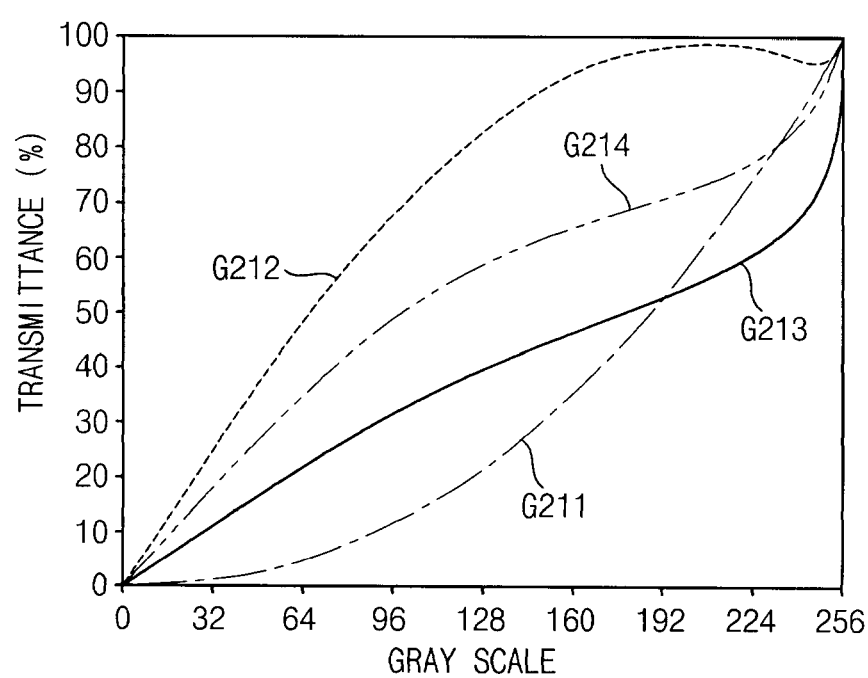
FIG. 21 is an exemplary embodiment of a gray scale-transmittance graph in accordance with a direction of observing the main pixel area of FIG. 20.

FIG. 20 is a diagram illustrating an exemplary embodiment of directions of liquid crystal molecules in the main pixel area of FIG. 18. FIG. 21 is an exemplary embodiment of a gray scale-transmittance graph in accordance with a direction of observing the main pixel area of FIG. 20.

Referring to FIG. 20, the first slit portion 2165 is formed to be rotated about 10 degrees from the direction of about 45 degrees or about 135 degrees from the polarized axis direction (namely, the first direction D01) of the polarized substrate (for example, the first oblique direction D03 or the second oblique direction D04) toward the first direction D01. When the electric field is applied to the liquid crystal layer, the direction of liquid crystal 2104 is substantially in a line arranged to the first slit portion 2165.

Referring to FIG. 21, curve G211 is a G-T result from observing in front of the main pixel area. Curve G214 is a G-T result from observing at a viewing angle of 60 degrees toward the top and bottom, when angle Φ3 of the first slit portion 2165 is about 45 degrees from the polarized axis, that is, the first direction D01. Curve G212 is a G-T result from observing at a viewing angle of 60 degrees toward the top and bottom, when angle Φ3 of the first slit portion 2165 has an angle between about 35 degrees and about 45 degrees (e.g., rotated about 10 degrees) from the first direction D01. Curve G213 is a G-T result from observing the main pixel area shown in FIGS. 17 and 20 at a viewing angle of angle of 60 degrees to the left and right.

Referring to the curves, when angle Φ3 of the liquid crystal 2104 is rotated or lower than 45 degrees, a form of the gamma curve observed from the top and bottom is made to differ. Specifically, in the upper side the gamma curve is moved to the brighter side and in the lower side the gamma curve is moved to the darker side.

Figure 22:
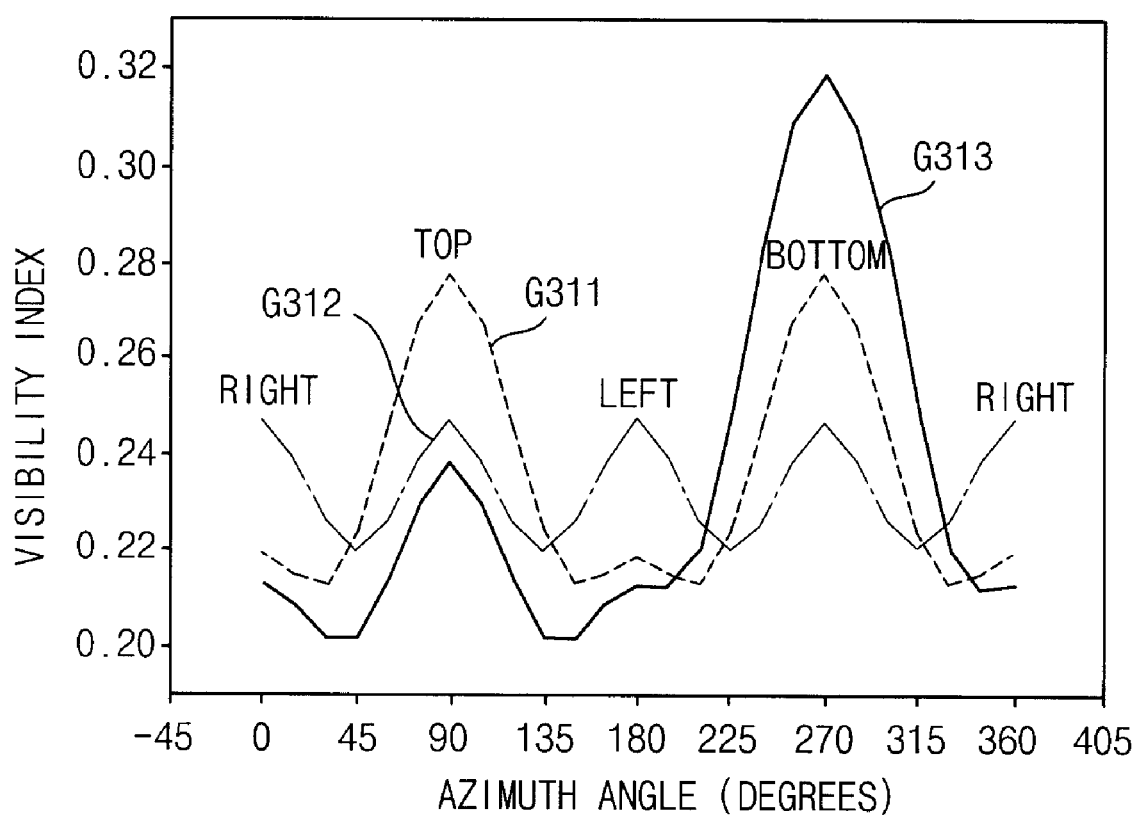
FIG. 22 is a graph showing an exemplary embodiment of a visibility index when the pixel of FIG. 17 is observed at each azimuth angle at a viewing angle of about 60 degrees.

FIG. 22 is a graph showing an exemplary embodiment of a visibility index when the pixel of FIG. 17 is observed at each azimuth angle at a viewing angle of about 60 degrees.

As described above, viewing angle characteristics are changed according to adjustments of the size ratio of the domains and the azimuth angle of the liquid crystal are combined, so that improved side visibility may be obtained in comparison to conventional side visibility.

To determine the optimum pixel structure, the low pixel, namely, the second electrode 2170 is formed with substantially the same conditions as conventional conditions. As conventional conditions, the upper and lower domains in the second pixel electrode 2170 have substantially the same size (e.g., area), and the second slit portion 2175 are disposed extended at about 45 degrees from the first direction D01 on the second pixel electrode 2170. In the illustrated exemplary embodiment, the size (e.g., area) ratio of the upper and the lower domains UP01 and UP02 in the high pixel, namely, the first pixel electrode 2160 is adjusted to be different from each other, and angle Φ3 the first slit portion 2165 are disposed extended to be between about 35 degrees and about 45 degrees from the first direction D01.

FIG. 22 illustrates the visibility index for each azimuth angle, when the display device changing the shape of the first pixel electrode 2160 is observed at the viewing angle of 60 degrees, as described above. When the visibility index is gradually lower, the display quality may be improved.

Referring to FIG. 22, curve G312 illustrates the azimuth angle-visibility index measurement results when the size (e.g., area) ratio of the high pixel and the low pixel is 2.5:1 in the S-PVA described in FIG. 4, the low pixel includes four domains having the same size, and the azimuth of the liquid crystal is 45 degrees from the first direction D01 in a case in which the electric field is applied.

Curve G313 illustrates the azimuth angle-visibility index measurement results when sizes of two domains of the top domain UPD01 of the first pixel electrode 2160 are relatively small and sizes of two domains of the bottom domain UP02 of the first pixel electrode 2160 are relatively large as shown in FIG. 17.

Curve G311 illustrates the azimuth angle-visibility index measurement results when the azimuth angle of the liquid crystal due to the azimuth angle of the first slit portions 2165 becomes 40 degrees from the first direction D01 as shown in FIG. 17.

First, with comparing curve G313 with curve G311, in curve G311, the visibility indexes to the left and right are remarkably reduced to improve the visibility. However, the visibility indexes when viewed from the top and bottom are remarkably increased. In addition, when the size ratio of the upper and lower domains of the first pixel electrode 2160 is changed into 3:7 in such a state, the visibility index in all directions except for the bottom side is more reduced than the conventional index to obtain the excellent visibility, as shown in curve G313. According to exemplary Embodiment 8, instead of losing the visibility of the bottom side, side visibility of other directions may be largely improved. Test examples about the size ratio of the domains and the azimuth angle of the slit portion (namely, the azimuth angle of the liquid crystal) are illustrated, referring to the following Table 1.

TABLE 1

| | High Pixel | | | | Low Pixel | | | |
|---|---|---|---|---|---|---|---|---|
| | UDS (%) | LDS (%) | ULA (°) | LLA (°) | UDS (%) | LDS (%) | ULA (°) | LLA (°) |
| OTE1 | 30 | 70 | 40 | 40 | 50 | 50 | 45 | 45 |
| OTE2 | 45 to 25 | 55 to 75 | 40 to 45 | 35 to 43 | 50 to 60 | 40 to 50 | 45 | 45 |
| TE1 | 50 | 50 | 40 | 40 | 50 | 50 | 45 | 45 |
| TE2 | 40 | 60 | 40 | 40 | 60 | 40 | 45 | 45 |
| TE3 | 40 | 60 | 45 | 37.5 | 60 | 40 | 45 | 45 |
| TE4 | 40 | 60 | 40 | 40 | 60 | 40 | 40 | 40 |

In Table 1, OTE1 represents an optimum test exemplary embodiment, OTE2 represents a range of an optimum embodiment, TE1 represents a first test exemplary embodiment 1, TE2 represents a second test exemplary embodiment 2, TE3 represents a third test exemplary embodiment 3, and TE4 represents a fourth test exemplary embodiment 4. In addition, in Table 1, UDS represents an upper domain size, LDS represents a lower domain size, ULA represents an upper liquid crystal angle, and LLA represents a lower liquid crystal angle.

Referring to Table 1, the suitable test exemplary that loses the visibility of the bottom side and remarkably improves the visibility when viewed from the top is illustrated as the test exemplary of the best mode. In Table 1, it is preferable that the size ratio of the top and bottom domains be set to about 3:7 in the high pixel (namely, the first pixel electrode 2160) and the azimuth angle Φ3 of the liquid crystal set to about 40 degrees.

Exemplary Embodiment 9

Figure 23:
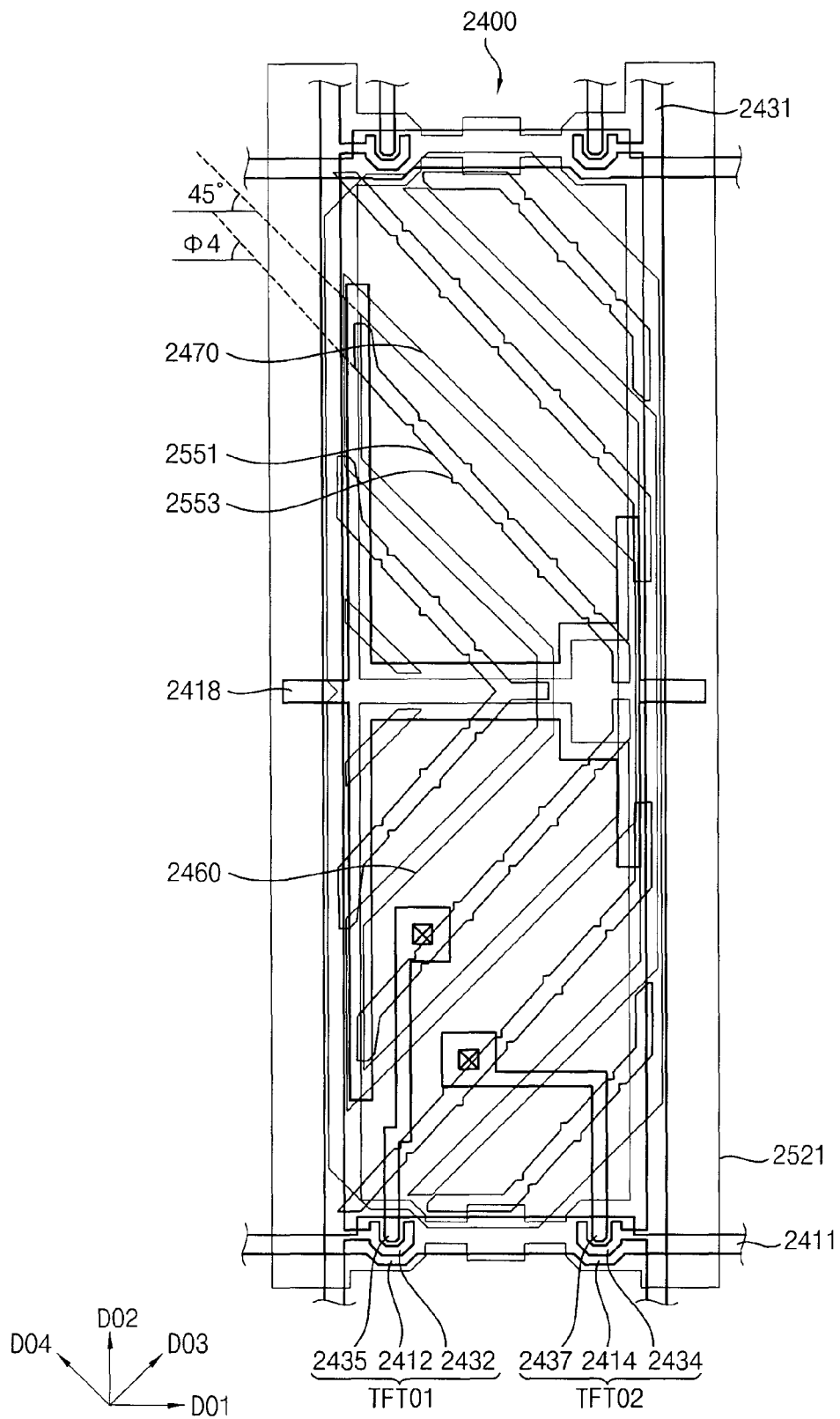
FIG. 23 is a plan view illustrating a pixel of the display device according to Exemplary Embodiment 9 of the present invention.

FIG. 23 is a plan view illustrating a pixel of the display device 2400 according to exemplary Embodiment 9 of the present invention.

The display device 2400 may include an array substrate, which may include a lower substrate, a plurality of a gate line 2411, a plurality of a storage line 2418, a gate insulation film, an active layer, a plurality of a data line 2431, a first switching element TFT01, a second switching element TFT02, a passivation film, an organic insulation film, a plurality of a pixel electrode 2470 and a lower alignment film.

The first switching element TFT01 and the second switching element TFT02 may be defined as an element including three terminals. In the illustrated embodiment, the first switching element TFT01 includes a gate electrode 2412, the gate insulation film, the channel layer, the source electrode 2432 and the drain electrode 2435. Similarly, the second switching element TFT02 includes a gate electrode 2414, the gate insulation film, the channel layer, a source electrode 2434 and a drain electrode 2437.

The pixel electrode 2470 is divided into a high pixel and a low pixel by the first slits 2470. Second slits 2551 positioned between the first slits 2470 are disposed extending in an oblique direction in the common electrode. Edges of the second slits 2551 may include notches 2553 disposed therein, to extend from the edge into a body of the common electrode, or from the edge outwardly.

Referring FIG. 23, an array substrate and a display device 2400 according to exemplary Embodiment 9 are substantially the same as the chevron display device 400 shown in FIG. 4, except that the azimuth angle D4 of the second slit 2551 disposed on the common electrode is changed, and the longitudinal centers of the second slits 2551 is departed from the center line of the unit pixel area in the first direction D01, further than the second slits 551 in FIG. 4.

The display device 2400 of exemplary Embodiment 9 includes an array substrate, an opposite substrate and a liquid crystal layer. The array substrate includes pixel electrode 2460. The pixel electrode 2460 includes first slits 2470. The first slits 2470 are symmetrically disposed with respect to the center line substantially parallel to the first direction D01, and are formed to have a first acute angle greater than or equal to about 45 degrees with respect to the center line.

The opposite substrate includes the common electrode including the second slits 2551. The angle of the second slit 2551 is a second acute angle, greater than about 45 degrees with respect to the center line, and greater than or equal to the first acute angle. In addition, the second slits 2551 are arranged between the first slits 2470 in the plan view, such that the first slits 2470 and the second slits 2551 alternate with each other in the unit pixel area. The liquid crystal layer is disposed between the array substrate and the opposite substrate.

The longitudinal centers of each of the second slits 2551 disposed extending to both sides of the center line are disposed to be spaced apart from the center line further than the second slits 551 in FIG. 4. A size of an area between the first slit 2470 and the second slit 2551 varies in a direction from the center line and towards distal ends of the first and second slits 2470 and 2551. As illustrated in FIG. 23, a planar area between a first slit 2470 and an adjacent second slit 2551 decreases in a direction from the center line of the unit pixel area toward distal ends of the first and second slits 2470 and 2551. The second acute angle of the second slit 2551 may be greater than 45 degrees and less than or equal to than 60 degrees. In an exemplary embodiment, the pixel electrode 2460 may include the high pixel (namely, the first pixel electrode) and the low pixel (namely, the second pixel electrode) divided by the first slit 2470. The first pixel electrode may have a substantially V-shape.

According to the array substrate and the display device 2400 of exemplary Embodiment 9, the angle and the position of the center portion of the first slit 2470 and the second slit 2551 are adjusted, so that the ratio of the areas of the top and bottom domains is consequently adjusted. In the illustrated exemplary embodiment, angle D4 of the second slit 2551 may be in a range between about 45 degrees and about 60 degrees from the first direction D01. Advantageously, the direction of the liquid crystal molecules is changed.

According to exemplary Embodiment 9, the visibility of the left-right direction or the left-right and up-down direction, may be improved.

According to the exemplary embodiments of the present invention, the side visibility of a display device may be improved. Advantageously, the present invention may improve the display quality of the LCD device.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. An array substrate comprising:
   a lower substrate including unit pixel areas each divided into a plurality of domains;
   a switching element disposed on the lower substrate and which transmits a pixel signal; and
   a pixel electrode connected to the switching element, the pixel electrode including a plurality of a slit portions, at least one of the slit portions having a plurality of bents bent in different directions with different angles to the data line as the at least one of the slit portions extends only away from the data line in a unit pixel area.

2. The array substrate of claim 1, wherein the pixel electrode further comprises a support electrode part longitudinally extended along a boundary between adjacent domains of the unit pixel area, and disposed continuous with the slit portions, and
   the slit portions are symmetrically arranged with respect to the support electrode part.

3. The array substrate of claim 2, wherein the pixel electrode further comprises a first pixel electrode and a second pixel electrode disposed in a main pixel area of the unit pixel area and a sub-pixel area of the unit pixel area, respectively, and
   each of the first and second pixel electrodes comprises the support electrode part and the slit portions.

4. The array substrate of claim 3, wherein the slit portion comprises:
   a zigzag portion directly extended from the support electrode part in a center portion of the main pixel area and a center portion of the sub-pixel area in the zigzag shape; and
   a straight line portion extended directly from the zigzag portion to an outer portion of the unit pixel area in a straight line shape, the zigzag portion and the straight line portion disposed continuous with each other.

5. The array substrate of claim 3, wherein the slit portion comprises:
   a straight line portion directly extended from the support electrode part in a center portion of the main pixel area and a center portion of the sub-pixel area in a straight line shape; and
   a zigzag portion directly extended from the straight line portion to an outer portion of the unit pixel area in the zigzag shape, the straight line portion and the zigzag portion disposed continuous with each other.

6. The array substrate of claim 3, wherein an entire of the slit portion is directly extended from the support electrode part to an outer portion of the unit pixel area in the zigzag shape.

* * * * *